United States Patent
Izumi

(10) Patent No.: US 11,478,876 B2
(45) Date of Patent: *Oct. 25, 2022

(54) LASER PROCESSING SYSTEM, JET OBSERVATION APPARATUS, LASER PROCESSING METHOD, AND JET OBSERVATION METHOD

(71) Applicant: Fanuc Corporation, Yamanashi (JP)

(72) Inventor: Takashi Izumi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 425 days.

This patent is subject to a terminal disclaimer.

(21) Appl. No.: 16/539,352

(22) Filed: Aug. 13, 2019

(65) Prior Publication Data

US 2020/0061743 A1 Feb. 27, 2020

(30) Foreign Application Priority Data

Aug. 24, 2018 (JP) ................. 2018-157786

(51) Int. Cl.
 *B23K 26/14* (2014.01)
 *B23K 26/02* (2014.01)
 (Continued)

(52) U.S. Cl.
 CPC .............. *B23K 26/14* (2013.01); *B23K 26/02* (2013.01); *B23K 26/083* (2013.01);
 (Continued)

(58) Field of Classification Search
 CPC .. B23K 26/14; B23K 26/354; B23K 26/1464; B23K 26/1476; B23K 26/02;
 (Continued)

(56) References Cited

U.S. PATENT DOCUMENTS 6,683,268 B2   1/2004   Briand et al.
8,464,594 B2   6/2013   Narendrnath et al.
(Continued)

FOREIGN PATENT DOCUMENTS

CN     1670491 A    9/2005
CN   102049613 A    5/2011
(Continued)

OTHER PUBLICATIONS

Blockley, R et al., "Encyclopedia of Aerospace Engineering 6-Environmental Impact, Manufacturing and Operations", Jun. 30, 2016, 7 pages, Beijing Institute of Technology Press (with brief English description).

(Continued)

*Primary Examiner* — Geoffrey S Evans
(74) *Attorney, Agent, or Firm* — RatnerPrestia

(57) ABSTRACT

A laser processing system that can effectively blow out a material of a workpiece melted by a laser beam by effectively utilizing an assist gas emitted from a nozzle. The laser processing system comprising a nozzle including an emission opening configured to emit a jet of an assist gas along an optical axis of a laser beam, the nozzle being configured to form a maximum point of velocity of the jet at a position away from the emission opening; a measuring instrument configured to measure a sound generated by the jet impinging on an object; and a position acquisition section configured to acquire information representing the position of the maximum point based on output data of the measuring instrument.

9 Claims, 29 Drawing Sheets

(51) Int. Cl.
*B23K 26/08* (2014.01)
*B23K 26/70* (2014.01)
*B23K 26/354* (2014.01)
*B23K 26/142* (2014.01)

(52) U.S. Cl.
CPC .......... *B23K 26/142* (2015.10); *B23K 26/147* (2013.01); *B23K 26/354* (2015.10); *B23K 26/702* (2015.10)

(58) Field of Classification Search
CPC .. B23K 26/083; B23K 26/702; B23K 26/147; B23K 26/142
See application file for complete search history.

(56) References Cited

U.S. PATENT DOCUMENTS

| | | | |
|---|---|---|---|
| 9,120,177 | B2 | 9/2015 | Inoue |
| 9,434,024 | B2 | 9/2016 | Numata et al. |
| 10,675,708 | B2 | 6/2020 | Bea et al. |
| 2016/0229019 | A1 | 8/2016 | Shuck et al. |
| 2017/0356773 | A1* | 12/2017 | Lowe ..................... G01F 1/667 |

FOREIGN PATENT DOCUMENTS

| | | |
|---|---|---|
| CN | 102804354 A | 11/2012 |
| CN | 103286445 A | 9/2013 |
| CN | 103764339 A | 4/2014 |
| CN | 103906597 A | 7/2014 |
| CN | 104159390 A | 11/2014 |
| DE | 102014001661 A1 | 8/2014 |
| JP | 2002018584 A | 1/2002 |
| JP | 2013071028 A | 4/2013 |
| JP | 2014113597 A | 6/2014 |
| JP | 2017-051965 A1 | 3/2017 |
| JP | 2018058110 A | 4/2018 |
| WO | WO-2019077875 A1 * | 4/2019 ............. B23K 26/38 |

OTHER PUBLICATIONS

USPTO Non Final Office Action for U.S. Appl. No. 16/540,525, dated Jun. 17, 2022, 7 pages.
USPTO Notice of Allowance for U.S. Appl. No. 16/540,525, dated Sep. 16, 2022, 9 pages.

* cited by examiner

FIG. 3
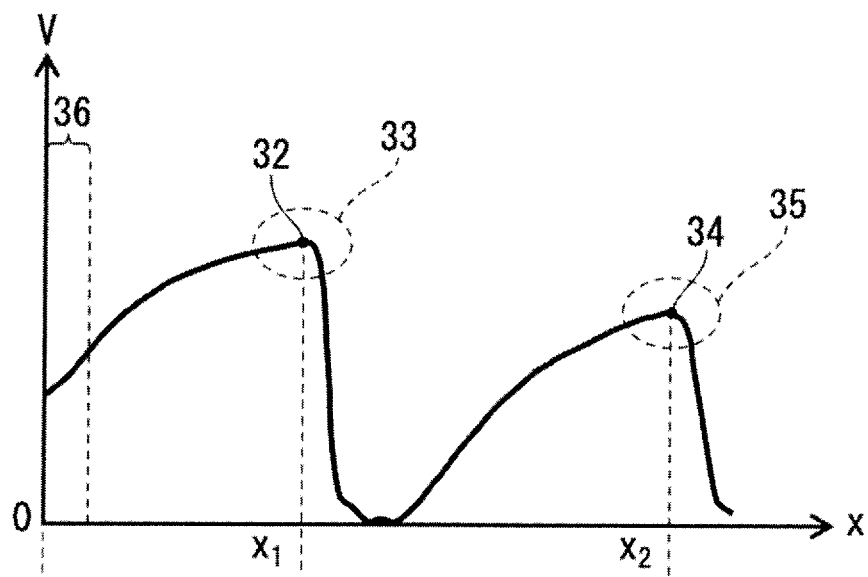
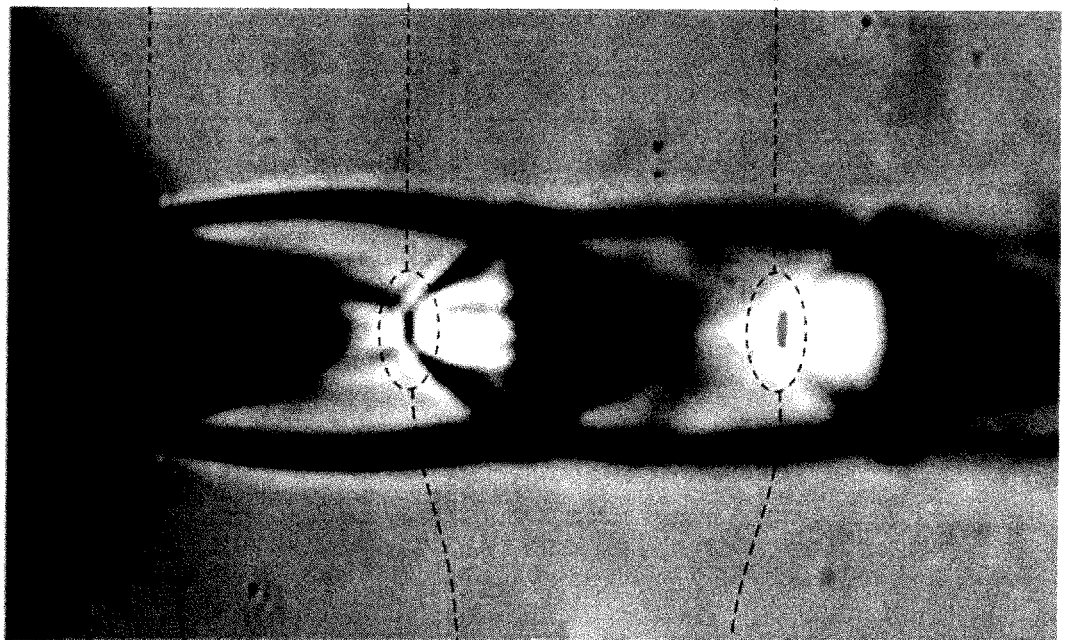

FIG. 4
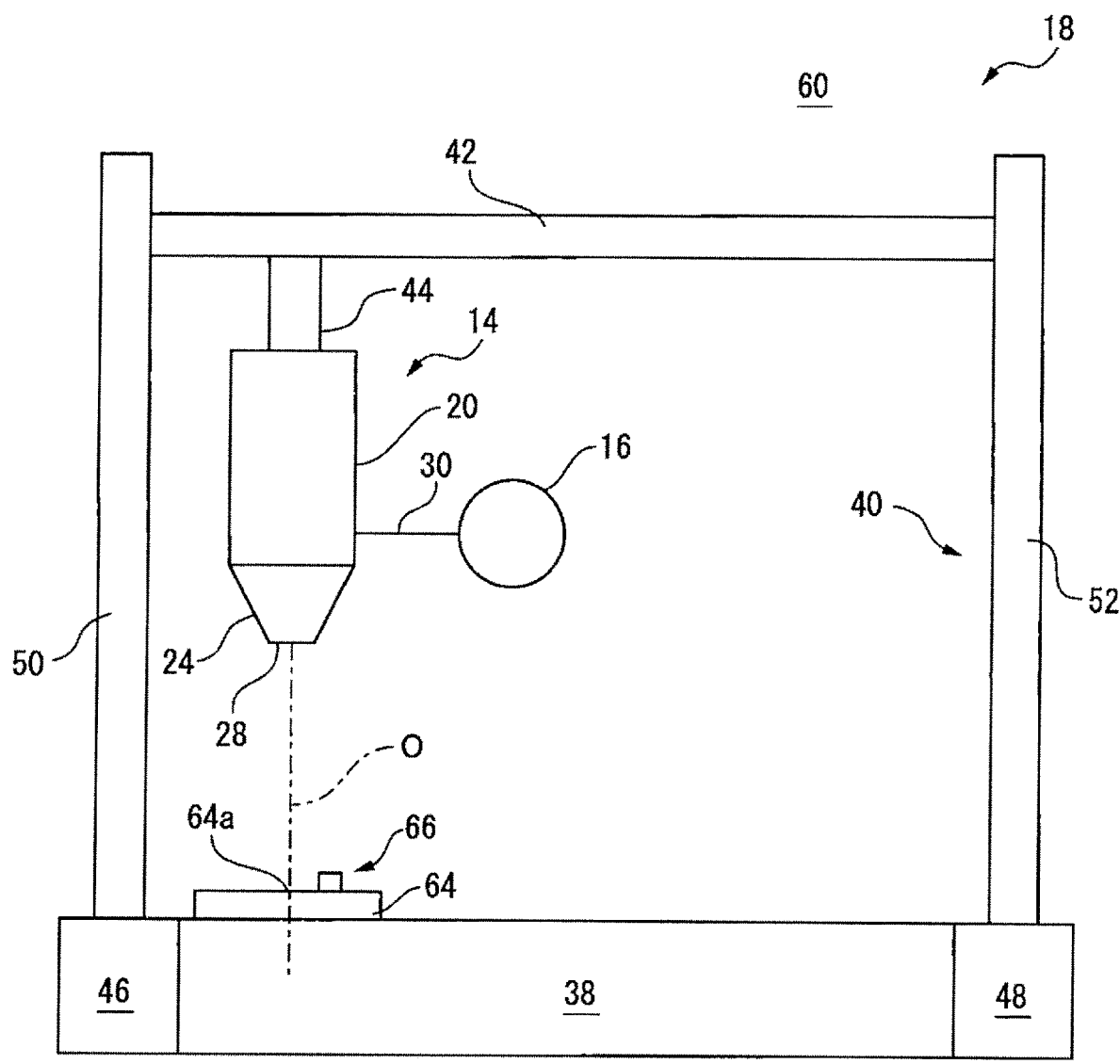
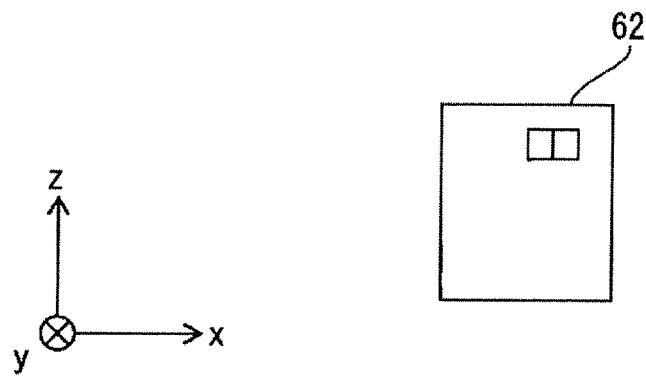

(a)          (b)

LASER PROCESSING SYSTEM, JET OBSERVATION APPARATUS, LASER PROCESSING METHOD, AND JET OBSERVATION METHOD

CROSS-REFERENCE TO RELATED APPLICATIONS

This application is a new U.S. Patent Application that claims benefit of Japanese Patent Application No. 2018-157786, dated Aug. 24, 2018, the disclosure of this application is being incorporated herein by reference in its entirety for all purposes.

BACKGROUND OF THE INVENTION

1. Field of the Invention

The present invention relates to a laser processing system, a jet observation apparatus, a laser processing method, and a jet observation method.

2. Description of the Related Art

A laser processing system has been known that includes a nozzle that, when processing a workpiece with a laser beam, emits an assist gas for blowing out a material of a workpiece that is melted by the laser beam (e.g., JP 2017-051965 A).

There has been a need for a laser processing system that can effectively blow out a material of a workpiece that is melted by a laser beam by effectively utilizing an assist gas emitted from a nozzle.

SUMMARY OF THE INVENTION

In an aspect of the present disclosure, a laser processing system comprising a nozzle including an emission opening configured to emit a jet of an assist gas along an optical axis of a laser beam, the nozzle being configured to form a maximum point of velocity of the jet at a position away from the emission opening; a measuring instrument configured to measure a sound generated by the jet impinging on an object; and a position acquisition section configured to acquire information representing the position of the maximum point based on output data of the measuring instrument.

In another aspect of the present disclosure, a jet observation apparatus comprising a measuring instrument configured to consecutively measure a sound generated by a jet of a gas, which is emitted from an emission opening of a nozzle, impinging on an object while the nozzle is moved close to or away from the object; and a position acquisition section configured to acquire, as information representing a position of a maximum point of velocity of the jet, a peak value of consecutive output data output by the measuring instrument, the maximum point being formed at the position away from the emission opening.

In still another aspect of the present disclosure, a method of laser process on object using the laser processing system of claim 1, the method comprising emitting the jet from the emission opening of the nozzle and processing the object with the laser beam, while disposing the nozzle with respect to a process portion of an object at a target position determined based on the information.

In still another aspect of the present disclosure, a method of observing a jet, the method comprising consecutively measuring a sound generated by a jet of a gas, which is emitted from an emission opening of a nozzle, impinging on an object while the nozzle is moved close to or away from the object; and acquiring, as information representing a position of a maximum point of velocity of the jet, a peak value of data obtained by consecutive measurement, the maximum point being formed at the position away from the emission opening.

According to the present disclosure, since the assist gas emitted from the nozzle during the process on the workpiece can be blown to the workpiece at a velocity which is sufficiently large, it is possible to effectively utilize the assist gas so as to effectively blow out a material of the workpiece melted by the laser beam.

BRIEF DESCRIPTION OF THE DRAWINGS

FIG. 3 is a diagram for illustrating a maximum point of velocity of a jet, an upper graph schematically shows a relationship between the velocity of the jet and a position x from an emission opening, and the image of FIG. 2 is shown below the graph.
FIG. 4 is a diagram of a jet observation apparatus.

DETAILED DESCRIPTION

Figure 1:
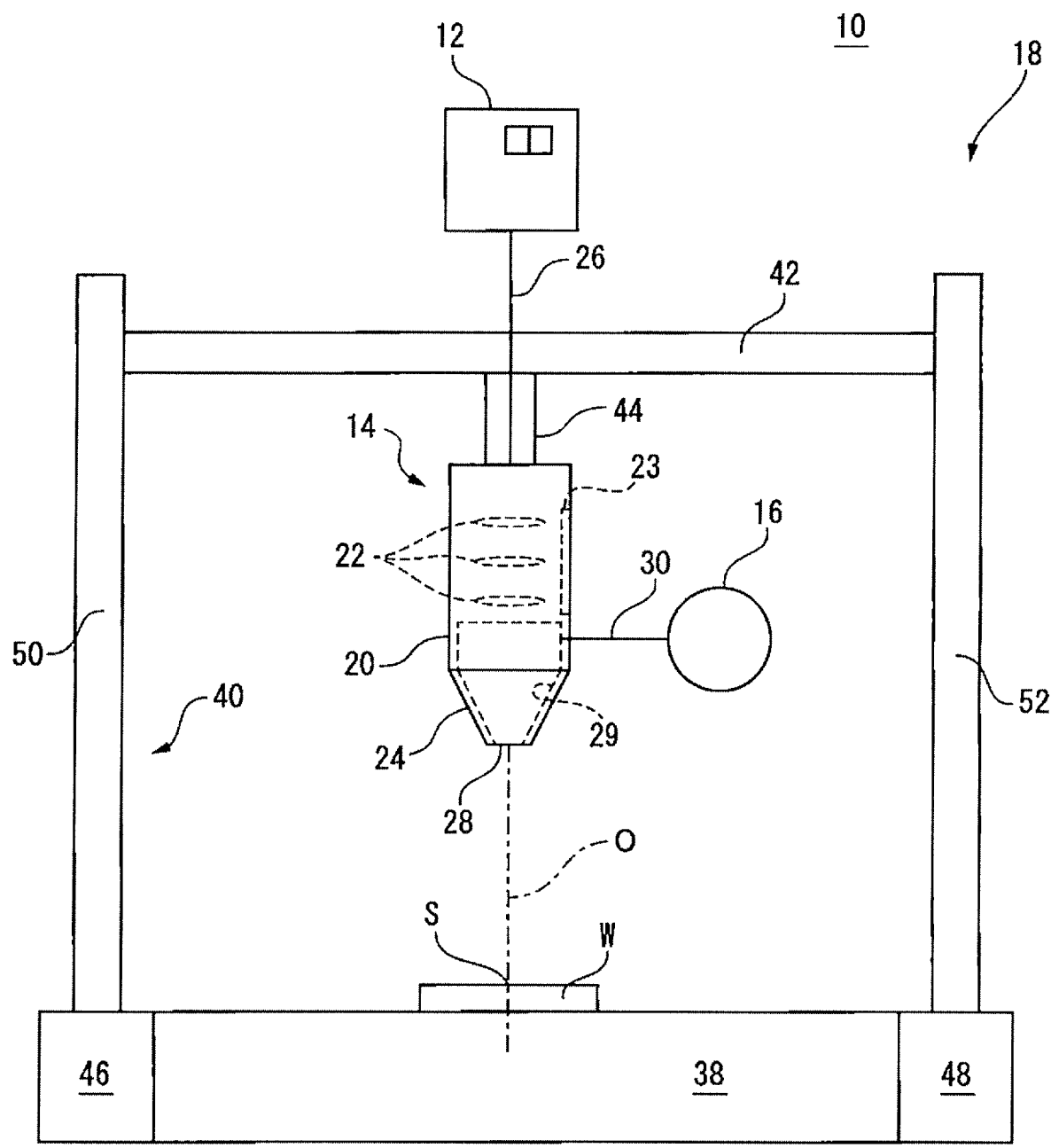
FIG. 1 is a diagram of a laser processing system.

Embodiments of the present disclosure will be described in detail below with reference to the drawings. Note that, in the various embodiments described below, the same reference numerals will be given to similar elements, and redundant descriptions thereof will be omitted. First, a laser processing system 10 will be described with reference to FIG. 1.

The laser processing system 10 includes a laser oscillator 12, a laser processing head 14, an assist gas supply device 16, and a positioning device 18. The laser oscillator 12 oscillates a laser inside thereof, and emits a laser beam to the outside. The laser oscillator 12 may be of any type, such as a $CO_2$ laser oscillator, a solid-state laser (YAG laser) oscillator, or a fiber laser oscillator.

The laser processing head 14 includes a head main body 20, optical lenses 22, a lens driver 23, and a nozzle 24. The head main body 20 is hollow, and an optical fiber 26 is connected to a proximal end of the head main body 20. The laser beam emitted from the laser oscillator 12 propagates inside the optical fiber 26 and enters inside of the head main body 20.

The optical lenses 22 include e.g. a collimating lens and a focusing lens, collimate and focus the laser beam entering into the head main body 20, and irradiate the laser beam onto a workpiece W. The optical lenses 22 are housed in the head main body 20 so as to be movable in a direction of an optical axis O.

The lens driver 23 moves each optical lens 22 in the direction of the optical axis O. The lens driver 23 adjusts a position of each optical lens 22 in the direction of the optical axis O, whereby it is possible to control a position of a focal point of the laser beam emitted from the nozzle 24 in the direction of the optical axis O.

The nozzle 24 is hollow and provided at a distal of the head main body 20. The nozzle 24 has a truncated conical outer shape in which a cross-sectional area orthogonal to the optical axis O decreases as it extends from the proximal end toward the distal end, and has a circular emission opening 28 at the distal end thereof. A hollow chamber 29 is formed inside the nozzle 24 and the head main body 20. The laser beam propagating from the optical lens 22 is emitted from the emission opening 28.

The assist gas supply device 16 supplies an assist gas to the chamber 29 formed in the nozzle 24 and the head main body 20 via a gas supply tube 30. The assist gas is e.g. nitrogen or air. The assist gas supplied to the chamber 29 is emitted, as a jet, from the emission opening 28 together with the laser beam along the optical axis O of the laser beam. The nozzle 24 forms a maximum point of velocity of the jet at a position away from the emission opening 28.

Figure 2:
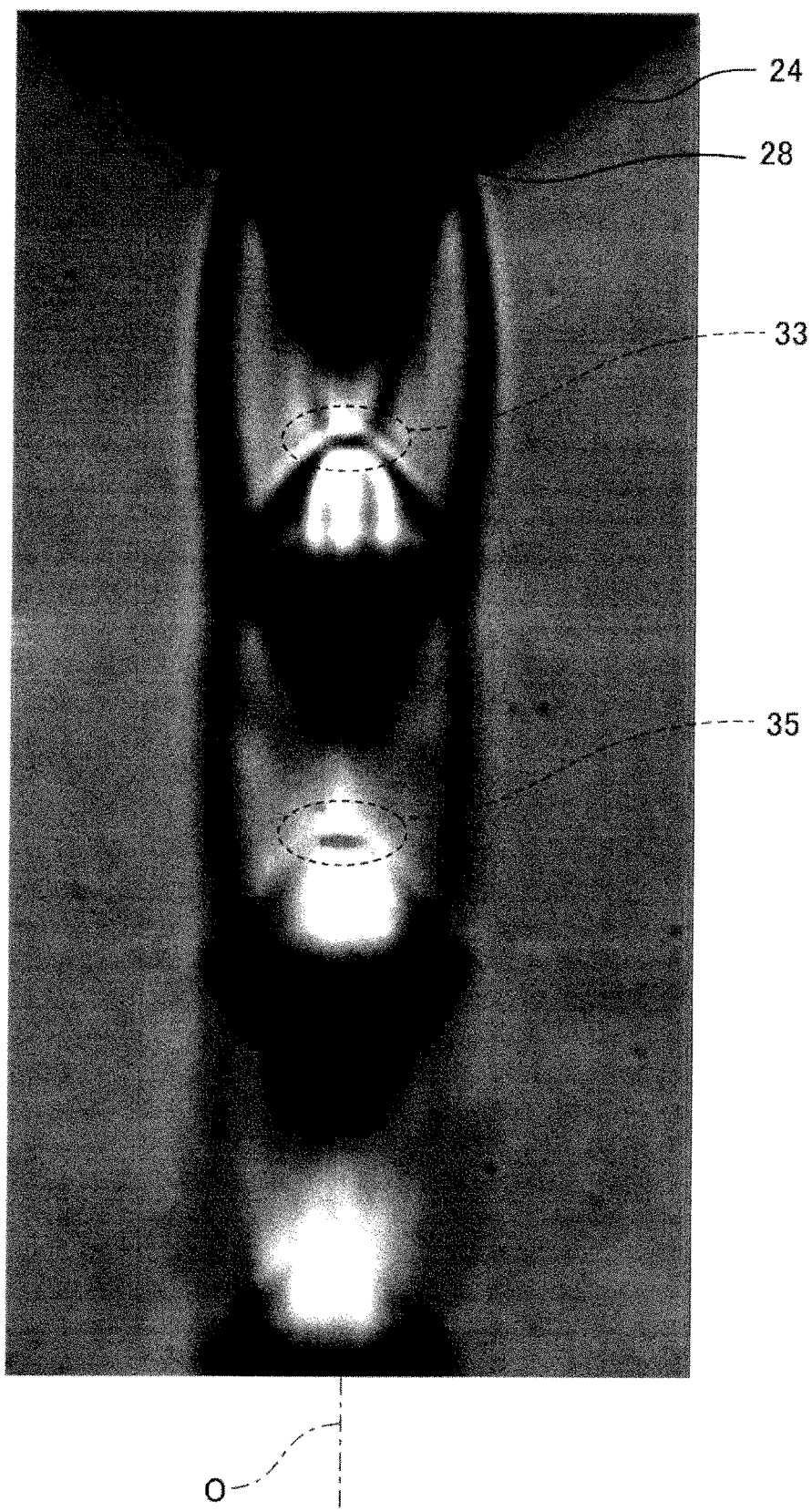
FIG. 2 is an image obtained by capturing a jet of an assist gas emitted from a nozzle with a high-speed camera.

The jet of the assist gas emitted from the nozzle 24 will be described below with reference to FIG. 2 and FIG. 3. FIG. 2 is an image captured by a high-speed camera imaging the jet emitted from the emission opening 28 of the nozzle 24.

FIG. 3 shows the image of the jet shown in FIG. 2 and a graph schematically showing a relationship between velocity V of the jet and position x in a direction away from the emission opening 28 along the optical axis O.

In this disclosure, the "velocity" of the jet is defined as a parameter including a flow velocity (unit: m/sec) and a flow rate (unit: $m^3$/sec) of the assist gas. The jet shown in FIG. 2 and FIG. 3 is formed under a condition in which the supply pressure to the chamber 29 is 1 MPa, and the opening dimension (diameter) of the emission opening 28 is 2 mm.

As shown in FIG. 2 and FIG. 3, in the jet of the assist gas emitted from the nozzle 24, a first Mach disk region 33 and a second Mach disk region 35, where the velocity V of the jet becomes local maximum, are formed at positions away from the emission opening 28 in the direction of the optical axis O. The position $x_1$ of the first maximum point 32 of the velocity V is included in the first Mach disk region 33, while the position $x_2$ of the second maximum point 34 of the velocity V is included in the second Mach disk region 35.

More specifically, as shown in the graph of FIG. 3, the velocity V of the jet gradually increases as a distance from the position of the emission opening 28 (i.e., x=0) along the optical axis O increases, and reaches the first maximum point 32 at the position $x_1$. Note that, in the jet in the image shown in FIG. 3, $x_1 \approx 4$ mm. In the first Mach disk region 33 including the position $x_1$, a so-called Mach disk, where reflected waves of the assist gas reflected at a boundary between the jet and an atmosphere outside the jet interfere and strengthen with each other, is formed.

The velocity V rapidly decreases as the distance in the direction away from the emission opening 28 from the position $x_1$ along the optical axis O further increases, then turns to increase, and reaches the second maximum point 34 at the position $x_2$. In the second Mach disk region 35 including the position $x_2$, a second Mach disk is formed.

Thus, in the jet emitted from the nozzle 24, a plurality of Mach disks are formed in the direction of the optical axis O, whereby the velocity V of the jet has a plurality of maximum points 32 and 34 in the direction of the optical axis O. The number of the Mach disks (i.e., maximum points) to be formed increases depending on the velocity V of the emitted jet.

In the present disclosure, when the laser processing system 10 carries out laser process on the workpiece W, the nozzle 24 is disposed with respect to a process portion S of the workpiece W at a target position determined based on the position $x_1$ or $x_2$ of the maximum point 32 or 34, such that the workpiece W (specifically, the process portion S of the workpiece W) is disposed in one of the Mach disk regions 33 and 35.

In the prior art, it has been considered preferable that the pressure of the assist gas blown to the workpiece W during the laser process on the workpiece W is as large as possible. The pressure of the assist gas is maximized at the position of the emission opening 28. Accordingly, in the prior art, when laser-processing the workpiece W, the workpiece W has been arranged as close as possible to the emission opening 28 at which the pressure is maximized. Specifically, in the prior art, the workpiece W has been disposed in a proximity region 36 in FIG. 3. This proximity region 36 is a region closer to the emission opening 28 than the first maximum point 32, wherein the pressure of the assist gas is almost a maximum value in this proximity region 36.

When the nozzle 24 and the workpiece W are thus arranged closer to each other and the laser process is carried out while the nozzle 24 is moved at high speed with respect to the workpiece W, plasma may be generated easier between the nozzle 24 and the workpiece W. When such plasma is generated, a finished surface of the workpiece W may become rough. Furthermore, when the nozzle 24 and the workpiece W are arranged closer to each other, particles of the workpiece W, that are melted and scattered by the laser process, may enter into the nozzle 24 through the emission opening 28, whereby a component (e.g., a protective glass) of the laser processing head 14 is more likely to be contaminated.

After diligent researching, the inventor obtained a knowledge that, as the velocity V of the assist gas blown to the workpiece W during the laser process on the workpiece W increases, the material of the workpiece W melted by the laser beam can be more effectively blown out by the assist gas.

Based on this knowledge, the present inventor focused on a fact that the above-described maximum points 32 and 34 are formed when the jet of the assist gas is emitted from the emission opening 28 of the nozzle 24, and found that, if the workpiece W is disposed in one of the Mach disk regions 33 and 35 during the laser process on the workpiece W, the assist gas can be blown to the workpiece W at the velocity V greater than that in the proximity region 36 to the emission opening 28.

Referring again to FIG. 1, the positioning device 18 disposes the nozzle 24 with respect to the process portion S at the target position determined based on the position $x_1$ of the maximum point 32 or the position $x_2$ of the maximum point 34, in order to dispose the workpiece W (e.g., process portion S) in the Mach disk region 33 or 35. Specifically, the positioning device 18 includes a work table 38, a y-axis movement mechanism 40, an x-axis movement mechanism 42, and a z-axis movement mechanism 44.

The work table 38 is fixed on a floor of a work cell. For example, the work table 38 has a plurality of needles extending in the z-axis direction in FIG. 1, and the workpiece W is installed on an installation surface defined by tips of the plurality of needles. The z-axis direction is substantially parallel to a vertical direction, for example.

The y-axis movement mechanism 40 includes a pair of rail mechanisms 46 and 48, and a pair of columns 50 and 52. Each of the rail mechanisms 46 and 48 includes e.g. a servo motor and a ball screw mechanism (both not illustrated) therein, and extends in the y-axis direction. The rail mechanisms 46 and 48 move the columns 50 and 52 in the y-axis direction, respectively.

The x-axis movement mechanism 42 includes e.g. a servo motor and ball screw mechanism (both not illustrated) therein, and is fixed to the columns 50 and 52 so as to extend between the columns 50 and 52. The x-axis movement mechanism 42 moves the z-axis movement mechanism 44 in the x-axis direction. The z-axis movement mechanism 44 includes e.g. a servo motor and a ball screw mechanism (both not illustrated) therein, and moves the laser processing head 14 in the z-axis direction. The laser processing head 14 is provided at the z-axis movement mechanism 44 such that the optical axis O of the laser beam to be emitted is parallel to the z-axis.

When the workpiece W is processed, the positioning device 18 disposes the nozzle 24 at the target position with respect to the process portion S. For example, a below-described controller (not illustrated) provided in the laser processing system 10 controls the positioning device 18 so as to automatically dispose the nozzle 24 with respect to the workpiece W at the target position. Alternatively, an operator may manually operate the positioning device 18 so as to dispose the nozzle 24 with respect to the process portion S at the target position.

Then, the assist gas supply device 16 supplies the assist gas to the chamber 29, and emits the jet of the assist gas, which has the Mach disk regions 33 and 35, from the emission opening 28. Then, the laser oscillator 12 emits the laser beam to the laser processing head 14, and the laser processing head 14 emits the laser beam from the emission opening 28 so as to irradiate the workpiece W. At this time, the lens driver 23 adjusts the position of each optical lens 22 in the direction of the optical axis O, such that the focal point of the laser beam emitted from the emission opening 28 is located at the process portion S.

In this way, the workpiece W is laser-processed in a stated where the workpiece W is disposed in the Mach disk region 33 or 35 of the jet. According to this configuration, since the assist gas emitted from the nozzle 24 can be blown to the workpiece W at the velocity V greater than that in the proximity region 36 of the emission opening 28 during the process on the workpiece W, it is possible to effectively make use of the assist gas so as to effectively blow out the material of the workpiece W melted by the laser beam.

Furthermore, it is possible to prevent the above-described plasma from being generated when compared to a case where the workpiece W is disposed in the proximity region 36 to the emission opening 28, as a result of which, the finishing quality of the workpiece W can be improved. In addition, it is possible to prevent the scattered particles of the workpiece W generated during the laser process from entering into the nozzle 24 when compared to the case where the workpiece W is disposed in the proximity region 36, as a result of which, the contamination of the component of the laser processing head 14 can be prevented.

Figure 5:
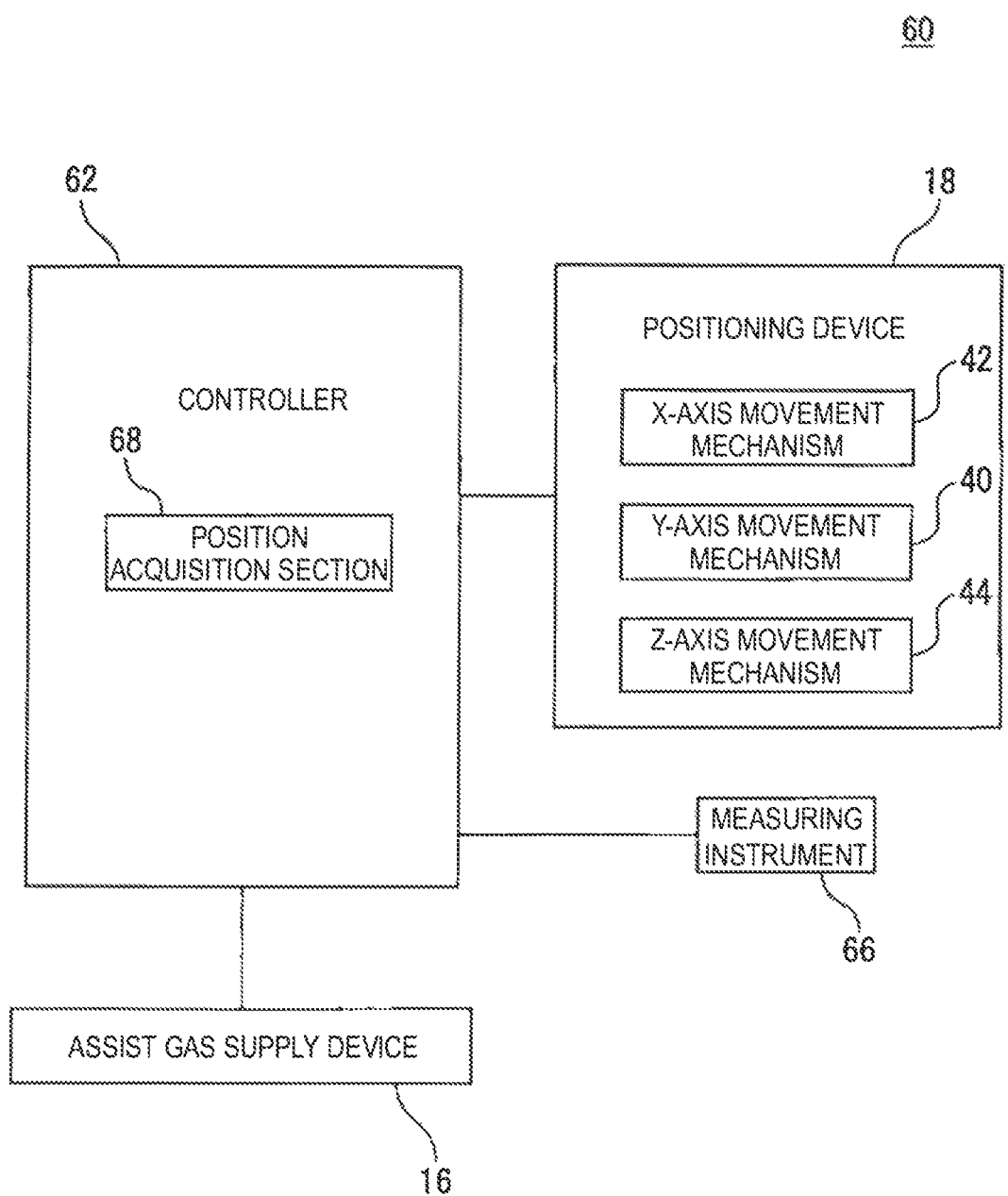
FIG. 5 is a block diagram of the jet observation apparatus illustrated in FIG. 4.

Next, a jet observation apparatus 60 will be described with reference to FIG. 4 and FIG. 5. The jet observation apparatus 60 acquires information representing the position $x_1$, $x_2$ of the above-described maximum point 32, 34. The jet observation apparatus 60 includes a controller 62, a dummy workpiece 64, a measuring instrument 66, and the above-described positioning device 18. The controller 62 includes a processor (CPU, GPU, etc.) and a storage (ROM, RAM, etc.), and controls the measuring instrument 66 and the positioning device 18.

The dummy workpiece 64 is installed on the installation surface of the work table 38. The dummy workpiece 64 has an outer shape (dimensions) the same as the workpiece W, and includes a dummy process portion 64a corresponding to the process portion S. In an example illustrated in FIG. 4, the dummy workpiece 64 is disposed at a position different from the installation position of the workpiece W during the laser process.

The measuring instrument 66 measures the velocity V of the jet emitted from the emission opening 28, at a position of the dummy process portion 64a (or a position slightly displaced from the dummy process portion 64a in a direction toward the emission opening 28). For example, the measuring instrument 66 includes a hot-wire anemometer configured to measure the velocity V in a contact manner, wherein the hot-wire anemometer includes a hot-wire which is disposed in the jet and the resistance value of which varies in response to the velocity V. Alternatively, the measuring instrument 66 includes a laser anemometer configured to measure the velocity V in a non-contact manner, wherein the laser anemometer includes an optical sensor configured to irradiate the jet with light and measure the velocity V.

The measuring instrument 66 measures the velocity V of the jet, and outputs it to the controller 62 as output data (measured values) α. The measuring instrument 66 may be disposed on the dummy workpiece 64, or may be disposed separate away from the dummy workpiece 64. The dummy workpiece 64 is disposed at forward (i.e., downstream) in the flow direction of the jet, and the measuring instrument 66 measures the velocity V at a position between the emission opening 28 and the dummy workpiece 64.

The positioning device 18 includes the work table 38, the y-axis movement mechanism 40, the x-axis movement mechanism 42, and the z-axis movement mechanism 44, and moves the laser processing head 14 in the x-axis, y-axis, and z-axis directions so as to move the laser processing head 14 with respect to the dummy workpiece 64 and the measuring instrument 66.

Next, a method of acquiring the position $x_1$, $x_2$ of the maximum point 32, 34 using the jet observation apparatus 60 will be described. First, the controller 62 operates the positioning device 18 so as to dispose the laser processing head 14 at an initial measuring position. When the laser processing head 14 is disposed at the initial measuring position, the laser processing head 14 is positioned with respect to the dummy workpiece 64 and the measuring instrument 66, such that the optical axis O of the laser processing head 14 intersects the dummy process portion 64a of the dummy workpiece 64, as illustrated in FIG. 4.

Also, a distance $d_a$ between the emission opening 28 and a measuring position of the measuring instrument 66 (i.e., the position of the dummy process portion 64a) is an initial value $d_{a0}$. As an example, the initial value $d_{a0}$ is set such that the measuring position of the measuring instrument 66 is disposed at a position close to the emission opening 28, such as the proximity region 36 in FIG. 3.

As another example, the initial value $d_{a0}$ is set such that the measuring position of the measuring instrument 66 is disposed at a position sufficiently separate to downstream of the jet from a position where a maximum point farthest from the emission opening 28 (in the example of FIG. 3, the second maximum point 34) is estimated to be located. The initial value $d_{a0}$ is predetermined by the operator.

Then, the controller 62 sends a command to the assist gas supply device 16, and in response to the command, the assist gas supply device 16 supplies the assist gas to the chamber 29 at a supply pressure $P_S$. The nozzle 24 emits the jet of the assist gas having the maximum points 32 and 34 of the velocity V, as shown in FIG. 2 and FIG. 3.

Then, the controller 62 operates the positioning device 18 so as to move the laser processing head 14 in the z-axis direction so as to change the distance $d_a$ between the emission opening 28 and the measuring position of the measuring instrument 66. As an example, if the above-described initial value $d_{a0}$ is set to dispose the measuring position of the measuring instrument 66 at the close position to the emission opening 28, the controller 62 operates the positioning device 18 so as to move the laser processing head 14 in the z-axis positive direction to increase the distance $d_a$.

As another example, if the above-described initial value $d_{a0}$ is set to dispose the measuring position of the measuring instrument 66 at downstream side of the maximum point farthest from the emission opening 28, the controller 62 operates the positioning device 18 so as to move the laser processing head 14 in the z-axis negative direction to decrease the distance $d_a$.

While the positioning device 18 moves the laser processing head 14 in the z-axis direction, the controller 62 sends a command to the measuring instrument 66 and cause the measuring instrument 66 consecutively measure the velocity V. For example, the measuring instrument 66 consecutively measures the velocity V at a predetermined period (e.g., 0.5 seconds) while the positioning device 18 moves the laser processing head 14. In this way, the measuring position of the measuring instrument 66 is moved relatively along the jet, and the measuring instrument 66 consecutively measures the velocity V along the jet.

The measuring instrument 66 outputs the measured velocity V as the output data α(=V) to the controller 62. A relationship between the output data α, which is outputted by the measuring instrument 66 in this way, and the distance $d_a$ corresponds to the relationship between the velocity V and the position x shown in FIG. 3. That is, the output data α acquired by the measuring instrument 66 changes in response to the distance $d_a$, and has a first peak value $α_{max1}$ at a position corresponding to the first maximum point 32 and a second peak value $α_{max2}$ at a position corresponding to the second maximum point 34.

The controller 62 acquires the first peak value $α_{max1}$ of the consecutive output data α outputted by the measuring instrument 66 as information representing the position $x_1$ of the first maximum point 32, and acquires the second peak value $α_{max2}$ as information representing the position $x_2$ of the second maximum point 34. In this way, the controller 62 functions as a position acquisition section 68 configured to acquire the information representing the position of the maximum point 32, 34 based on the output data α.

Then, the controller 62 acquires, as a target distance $d_T$, the distance $d_a$ between the measuring position of the measuring instrument 66 (i.e., the position of the dummy process portion 64a) and the emission opening 28 when the first peak value $α_{max1}$ is measured. This target distance $d_T$ represents the position of the first maximum point 32 with respect to the emission opening 28, and can be acquired by e.g. a known gap-sensor, a displacement measuring instrument, or the like.

Then, the controller 62 resisters the target distance $d_T$ in a data base in association with the opening dimension ϕ of the emission opening 28 and the supply pressure $P_S$ when measuring the velocity V, and stores it in the storage. The operator changes the opening dimension ϕ of the nozzle 24 and the supply pressure $P_S$ in various ways, and the controller 62 acquires the target distance $d_T$ and registers it in the database of the above-described method, each time the opening dimension ϕ and the supply pressure $P_S$ are changed. Note that, if the emission opening 28 is circular, the opening dimension is a diameter.

Table 1 below shows an example of the database of the opening dimension ϕ, the supply pressure $P_S$, and the target distance $d_T$.

TABLE 1

| | | Supply Pressure $P_s$ | | |
| --- | --- | --- | --- | --- |
| | | 0.8 MPa | . . . | 2.0 MPa |
| Opening dimension ϕ | ϕ1.0 | $d_T$ = 4 mm | . . . | $d_T$ = 6 mm |
| | . . . | . . . | . . . | . . . |
| | ϕ4.0 | $d_T$ = 6 mm | . . . | $d_T$ = 10 mm |

In the database shown in Table 1, a plurality of the target distances $d_T$ are set in association with the opening dimension ϕ of the nozzle 24 and the supply pressure $P_S$. Note that, the controller 62 may acquire, as a second target distance $d_{T\_2}$, a distance $d_{a\_2}$ between the emission opening 28 and the measuring position of the measuring instrument 66 when the second peak value $\alpha_{max2}$ is measured, and may similarly create a database of the second target distance $d_{T\_2}$. Further, different databases may also be created for different kinds of the assist gas (nitrogen, air, etc.).

The database of the target distance $d_T$ created in this manner is used to determine a target position at which the nozzle 24 is to be disposed when the laser process is carried out onto the workpiece W in the laser processing system as described below. For example, if the opening dimension $\phi$ of the emission opening 28 of the nozzle 24 used during the laser process is 4 mm and the supply pressure $P_S$ to the chamber 29 is 2.0 MPa, the data of $d_T$=10 mm is used to determine the target position.

In this way, by measuring the velocity V of the jet of the assist gas, the information representing the position of the maximum point 32, 34 can be acquired. According to this configuration, it is possible to obtain the position of the maximum point 32, 34 with high accuracy by measurement.

In addition, the jet observation apparatus 60 includes the dummy workpiece 64. In this regard, when the laser process is actually carried out, the assist gas is blown onto the workpiece W. In the jet observation apparatus 60, the assist gas is blown onto the dummy workpiece 64 instead of the workpiece W, and the positions of the maximum points 32 and 34 are measured from the velocity V measured at the position of the dummy process portion 64a of the dummy workpiece 64. According to this configuration, since the position of the maximum point 32, 34 can be measured in a state analogous to actual the laser process, it is possible to measure the position of the maximum point 32, 34 with higher accuracy.

Further, the dummy workpiece 64 has an outer shape (dimensions) the same as the workpiece W. According to this configuration, since the position of the maximum point 32, 34 can be measured in a state significantly analogous to actual laser processing, it is possible to measure the position of the maximum point 32, 34 with further higher accuracy. Note that, the dummy workpiece 64 may have an outer shape (dimensions) different from the workpiece W. In this case, the dummy workpiece 64 may have a thickness in the z-axis direction the same as that of the workpiece W, and include the portion 64a corresponding to the process portion S. Also, the position of the maximum point 32, 34 can be acquired without the dummy workpiece 64.

Figure 6:
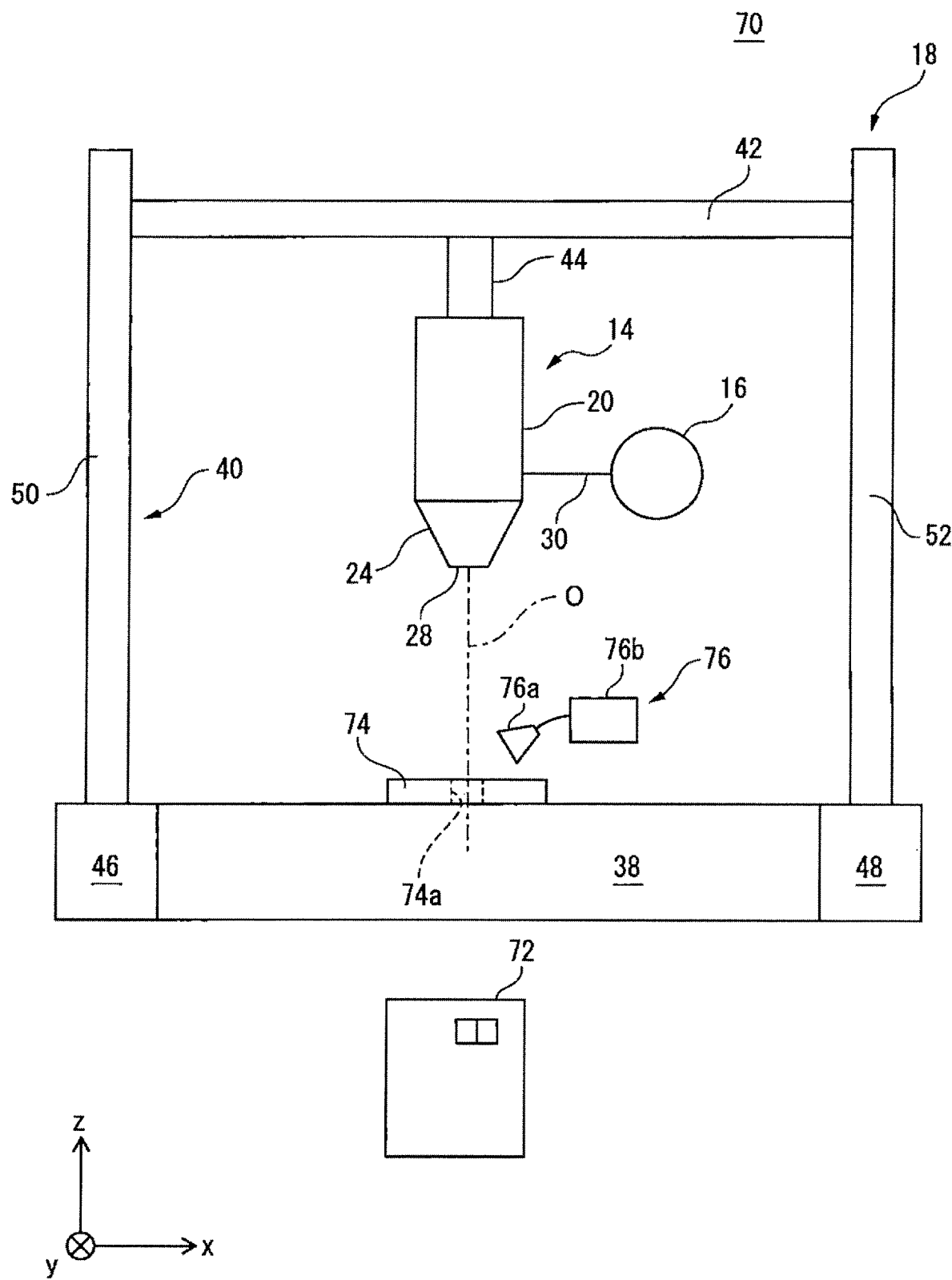
FIG. 6 is a diagram of another jet observation apparatus.
Figure 7:
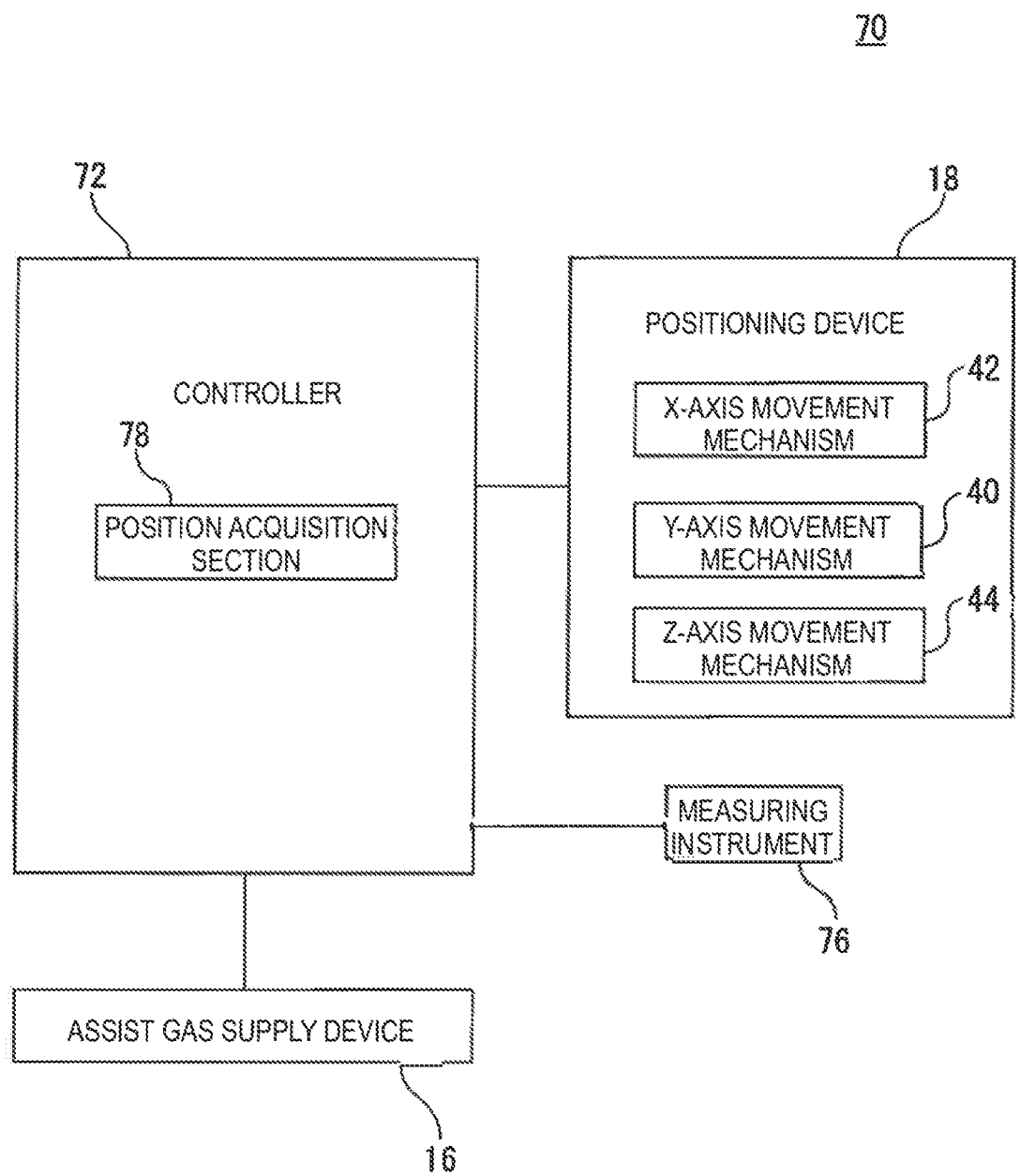
FIG. 7 is a block diagram of the jet observation apparatus illustrated in FIG. 6.

Then, a jet observation apparatus 70 will be described with reference to FIG. 6 and FIG. 7. The jet observation apparatus 70 acquires the above-described information representing the position $x_1$, $x_2$ of the maximum point 32, 34. The jet observation apparatus 70 includes a controller 72, a measuring instrument 76, and the positioning device 18. The controller 72 includes a processor and a storage (not illustrated), and controls the measuring instrument 76 and the positioning device 18.

The positioning device 18 includes the work table 38, the y-axis movement mechanism 40, the x-axis movement mechanism 42, and the z-axis movement mechanism 44, wherein an object 74 is installed on the work table 38. The positioning device 18 moves the laser processing head 14 in the x-axis, y-axis, and z-axis directions, thereby moving the nozzle 24 with respect to the object 74.

A circular through hole 74a is formed in the object 74. An opening dimension of the through hole 74a is set to be substantially the same as an opening dimension of a through hole that is estimated to be formed when the workpiece W is perforated by a laser beam emitted from the nozzle 24. The object 74 may have an outer shape (dimensions) the same as the workpiece W, or have a different outer shape (dimensions) from the workpiece W. Furthermore, the object 74 may have a thickness in the z-axis direction the same as the workpiece W, and include a portion corresponding to the process portion S.

The measuring instrument 76 is disposed adjacent to the through hole 74a, and measures a sound pressure SP or a frequency f of a sound generated by the jet emitted from the emission opening 28 of the nozzle 24 impinging on the object 74 when passing through the through hole 74a. Note that, in the present disclosure, the "sound pressure" of the sound includes not only a sound pressure (unit: Pa), but also a sound pressure level (unit: dB), sound intensity (unit: $W/m^2$), etc.

Further, the "frequency" of the sound includes not only the frequency of the sound, but also frequency characteristic of the sound (i.e., a frequency spectrum). The frequency characteristic includes information such as a sound pressure level of at least one frequency component (e.g., 1 Hz), an average sound pressure level in a predetermined frequency band (e.g., 1 kHz to 10 kHz), etc. The measuring instrument 76 includes a microphone 76a configured to convert a sound into an electrical signal, and a frequency acquisition section 76b configured to acquire a frequency characteristic of the sound from the electrical signal.

Next, a method of acquiring the position $x_1$, $x_2$ of the maximum point 32, 34 using the jet observation apparatus 70 will be described. First, the controller 72 operates the positioning device 18 so as to dispose the laser processing head 14 at an initial measuring position. When the laser processing head 14 is disposed at the initial measuring position, the laser processing head 14 is positioned with respect to the object 74 such that the optical axis O of the laser processing head 14 passes through the through hole 74a, as illustrated in FIG. 6. Additionally, a distance $d_b$ between the emission opening 28 and the object 74 is an initial value $d_{b0}$.

As an example, the initial value $d_{b0}$ is set such that the object 74 is disposed at a position close to the emission opening 28, such as the proximity region 36 in FIG. 3. As another example, the initial value $d_{b0}$ is set such that the object 74 is disposed at a position sufficiently separate to downstream side of the jet from a position where a maximum point farthest from the emission opening 28 (in the example of FIG. 3, the second maximum point 34) is estimated to be located.

Then, the controller 72 sends a command to the assist gas supply device 16, and in response to the command, the assist gas supply device 16 supplies the assist gas to the chamber 29 at the supply pressure $P_S$. The nozzle 24 emits the jet of the assist gas having the maximum points 32 and 34. Then, the controller 72 operates the positioning device 18 so as to move the laser processing head 14 in the z-axis direction to change the distance $d_b$ between the object 74 and the emission opening 28.

As an example, if the above-described initial value $d_{b0}$ is set so as to dispose the object 74 at the position close to the emission opening 28, the controller 72 operates the positioning device 18 so as to move the laser processing head 14 in the z-axis positive direction to increase the distance $d_b$.

As another example, if the above-described initial value $d_{b0}$ is set so as to dispose the object 74 at downstream side of a maximum point farthest from the emission opening 28, the controller 72 operates the positioning device 18 so as to move the laser processing head 14 in the z-axis negative direction to decrease the distance $d_b$.

While the positioning device 18 moves the laser processing head 14 in the z-axis direction to bring the nozzle 24 closer to or away from the object 74, the controller 72 sends a command to the measuring instrument 76 so as to cause the measuring instrument 76 to consecutively measure the sound pressure SP or the frequency f. For example, the measuring instrument 76 consecutively measures the sound pressure SP or the frequency f at a predetermined period (e.g., 0.5 seconds) while the positioning device 18 moves the laser processing head 14. The measuring instrument 66 sequentially outputs the measured sound pressure SP or the frequency f to the controller 72 as output data β (=SP or f).

The sound pressure SP and the frequency f of the sound generated by the jet impinging on the object 74 during passing through the through hole 74a are highly correlated with a flow velocity $V_S$ of the assist gas. Specifically, the sound pressure (peak value, effective value, etc.) of the sound generated by the jet impinging on the object 74 and frequency characteristic of the sound (e.g., a sound pressure level of at least one frequency component) are highly correlated with the flow velocity $V_S$ of the assist gas.

Therefore, a relationship between the acquired output data β and the distance $d_b$ corresponds to the graph illustrated in FIG. 3. That is, the output data β from the measuring instrument 76 changes in response to the distance $d_b$, and has a first peak value $β_{max1}$ at a position corresponding to the first maximum point 32 and a second peak value $β_{max2}$ at a position corresponding to the second maximum point 34.

The controller 72 acquires the first peak value $β_{max1}$ of the consecutive output data β outputted by the measuring instrument 76 as information representing the position $x_1$ of the first maximum point 32, and acquires the second peak value $β_{max2}$ as information representing the position $x_2$ of the second maximum point 34. In this way, the controller 72 functions as a position acquisition section 78 configured to acquire the information representing the position of the maximum point 32, 34 based on the output data β.

Then, the controller 72 acquires, as the target distance $d_T$, the distance $d_b$ between the object 74 and the emission opening 28 when the first peak value $β_{max1}$ is measured. This target distance $d_T$ represents the position of the first maximum point 32 with respect to the emission opening 28, and can be acquired using e.g. a known gap-sensor or the like.

Then, the controller 72 registers the target distance $d_T$ and the first peak value $β_{max1}$ in a database in association with the opening dimension ϕ of the emission opening 28 and the supply pressure $P_S$ when the sound pressure SP and the frequency f are measured. Table 2 below shows an example of the database of the opening dimension ϕ, the supply pressure $P_S$, the first peak value $β_{max1}$, and the target distance $d_T$.

TABLE 2

| Opening dimension ϕ | Supply Pressure $P_s$ | | | | |
|---|---|---|---|---|---|
| | 0.8 MPa | | ... | 2.0 MPa | |
| | Peak Value | Distance | ... | Peak Value | Distance |
| ϕ1.0 | 114 dB | d = 4 mm | ... | 120 dB | d = 6 mm |
| ... | ... | ... | ... | ... | ... |
| ϕ4.0 | 110 dB | d = 6 mm | ... | 117 dB | d = 10 mm |

In the database shown in Table 2, the first peak value $β_{max1}$ (sound pressure level) and the target distance $d_T$ are registered in association with the opening dimension ϕ of the nozzle 24 and the supply pressure $P_S$. Note that, the controller 72 may acquire, as a second target distance $d_{T\_2}$, a distance $d_{b\_2}$ between the emission opening 28 and the object 74 when the second peak value $β_{max2}$ is measured, and may similarly create a database of the second target distance $d_{T\_2}$.

Further, a plurality of databases may also be created for respective types of assist gas (nitrogen, air, etc.). The database of the target distance $d_T$ created in this manner is used to determine a target position at which the nozzle 24 is to be disposed when the laser process is carried out onto the workpiece W in a laser processing system, as described below.

As described above, according to the jet observation apparatus 70, the information representing the position $x_1$, $x_2$ of the maximum point 32, 34 can be acquired, based on the sound generated when the jet of the assist gas impinges on the object 74. According to this configuration, it is possible to obtain the position $x_1$, $x_2$ of the maximum point 32, 34 with high accuracy, by measurement. Further, the jet observation apparatus 70 can acquire the information representing the position $x_1$, $x_2$ of the maximum point 32, 34 during the laser process, as described below.

Figure 8:
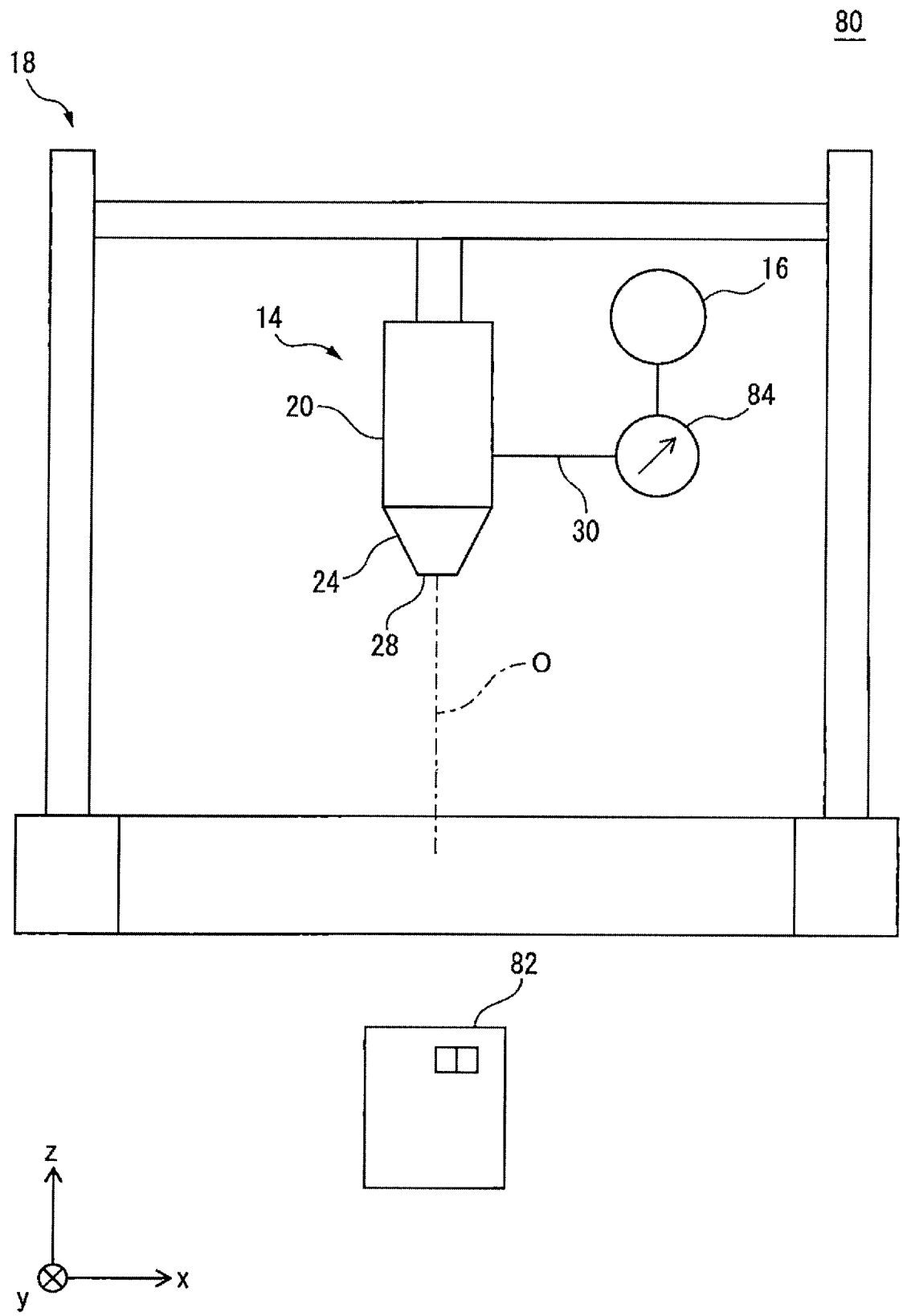
FIG. 8 is a diagram of yet another jet observation apparatus.
Figure 9:
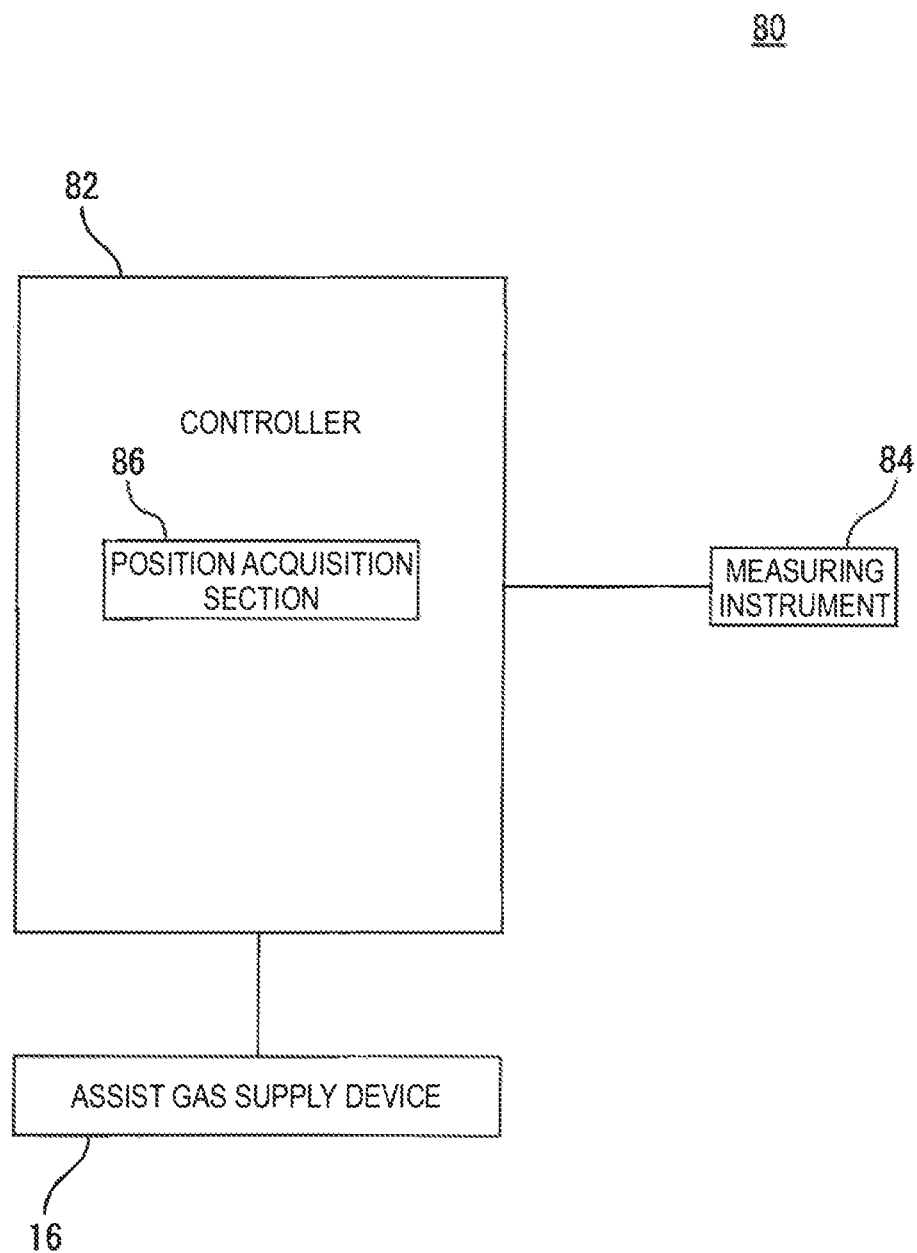
FIG. 9 is a block diagram of the jet observation apparatus illustrated in FIG. 8.

Then, a jet observation apparatus 80 will be described with reference to FIG. 8 and FIG. 9. The jet observation apparatus 80 acquires the above-described position $x_1$ of the first maximum point 32, by a predetermined calculation. The jet observation apparatus 80 includes a controller 82 and a measuring instrument 84. The controller 82 includes a processor and a storage (not illustrated), and controls the measuring instrument 84.

The measuring instrument 84 measures a supply flow rate $V_V$ of the assist gas supplied from the assist gas supply device 16 to the chamber 29. The measuring instrument 84 is installed in the gas supply tube 30, and measures the flow rate $V_V$ of the assist gas flowing through the gas supply tube 30 from the assist gas supply device 16 toward the chamber 29.

Next, a method of acquiring the position $x_1$ of the first maximum point 32 by the jet observation apparatus 80 will be described. First, the controller 82 sends a command to the assist gas supply device 16, and in response to the command, the assist gas supply device 16 supplies the assist gas to the chamber 29. The nozzle 24 emits the jet of the assist gas having the maximum points 32 and 34.

Then, the controller 82 sends a command to the measuring instrument 84, and in response to the command, the measuring instrument 84 measures the supply flow rate $V_V$ from the assist gas supply device 16 to the chamber 29. The measuring instrument 84 outputs output data (measurement value) of the supply flow rate $V_V$ to the controller 82. Then, the controller 82 calculates a distance $d_c$ from the emission opening 28 to the first maximum point 32, as information of the position $x_1$ of the first maximum point 32, using the output data $V_V$ from the measuring instrument 84 and Equation 1 indicated below.

$$d_c = 0.67 \times \phi \times (\rho V_S^2/2)^{1/2} \quad \text{(Equation 1)}$$

In the Equation 1, ϕ indicates the opening dimension of the emission opening 28, ρ indicates a viscosity coefficient of the assist gas, and $V_S$ indicates the flow velocity $V_S$ of the assist gas obtained from the output data $V_V$ and the opening dimension ϕ. In this way, the controller 82 functions as a position acquisition section 86 configured to acquire the position $x_1$ of the first maximum point 32 by calculation, from the output data $V_V$ of the measuring instrument 84.

According to the jet observation apparatus 80, it is possible to quickly obtain the position $x_1$ of the first maximum point 32 with high accuracy, by calculation. Also, the jet observation apparatus 80 can acquire the position $x_1$ of the first maximum point 32 in real-time during the laser process, as described below.

Figure 10:
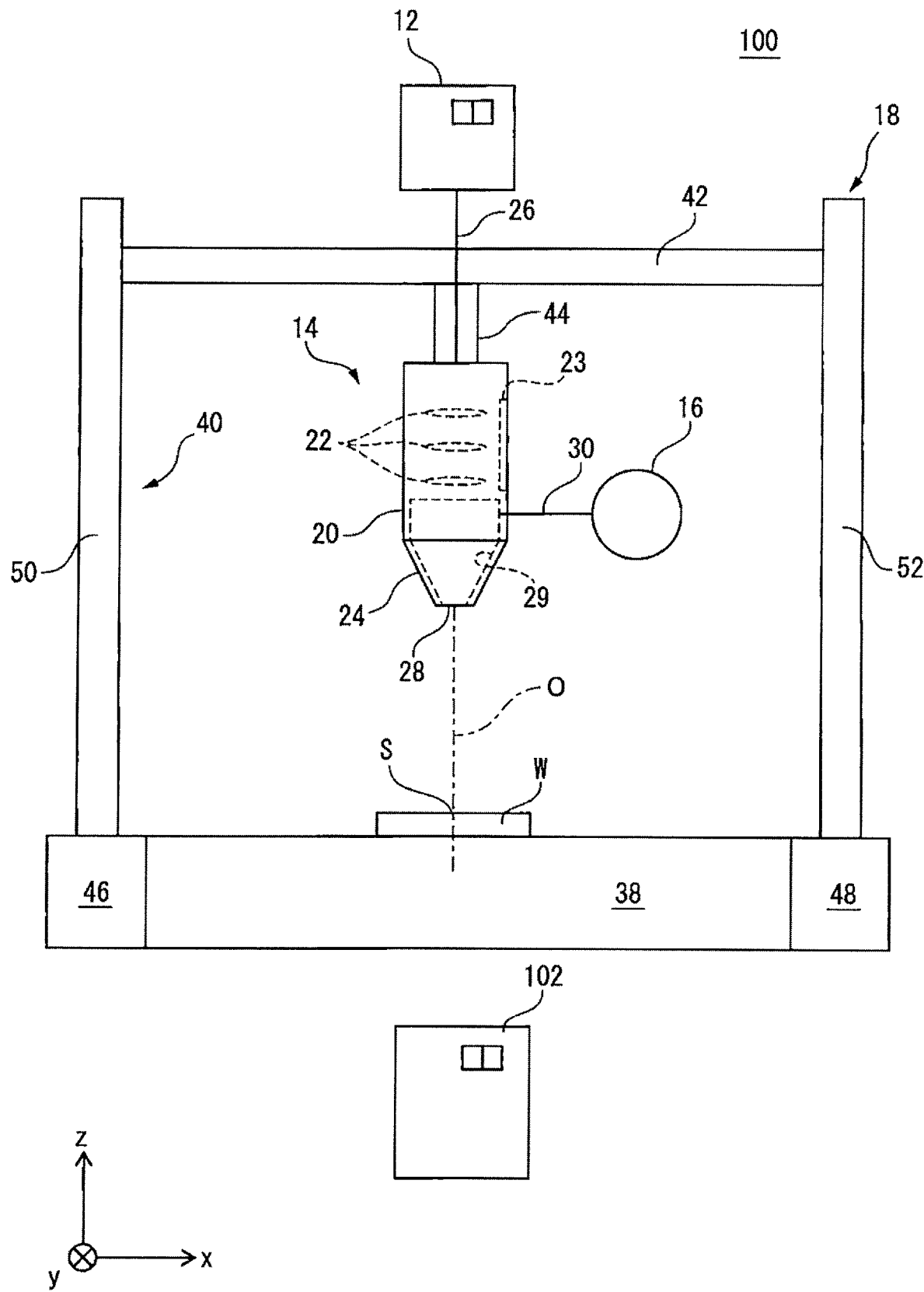
FIG. 10 is a diagram of another laser processing system.
Figure 11:
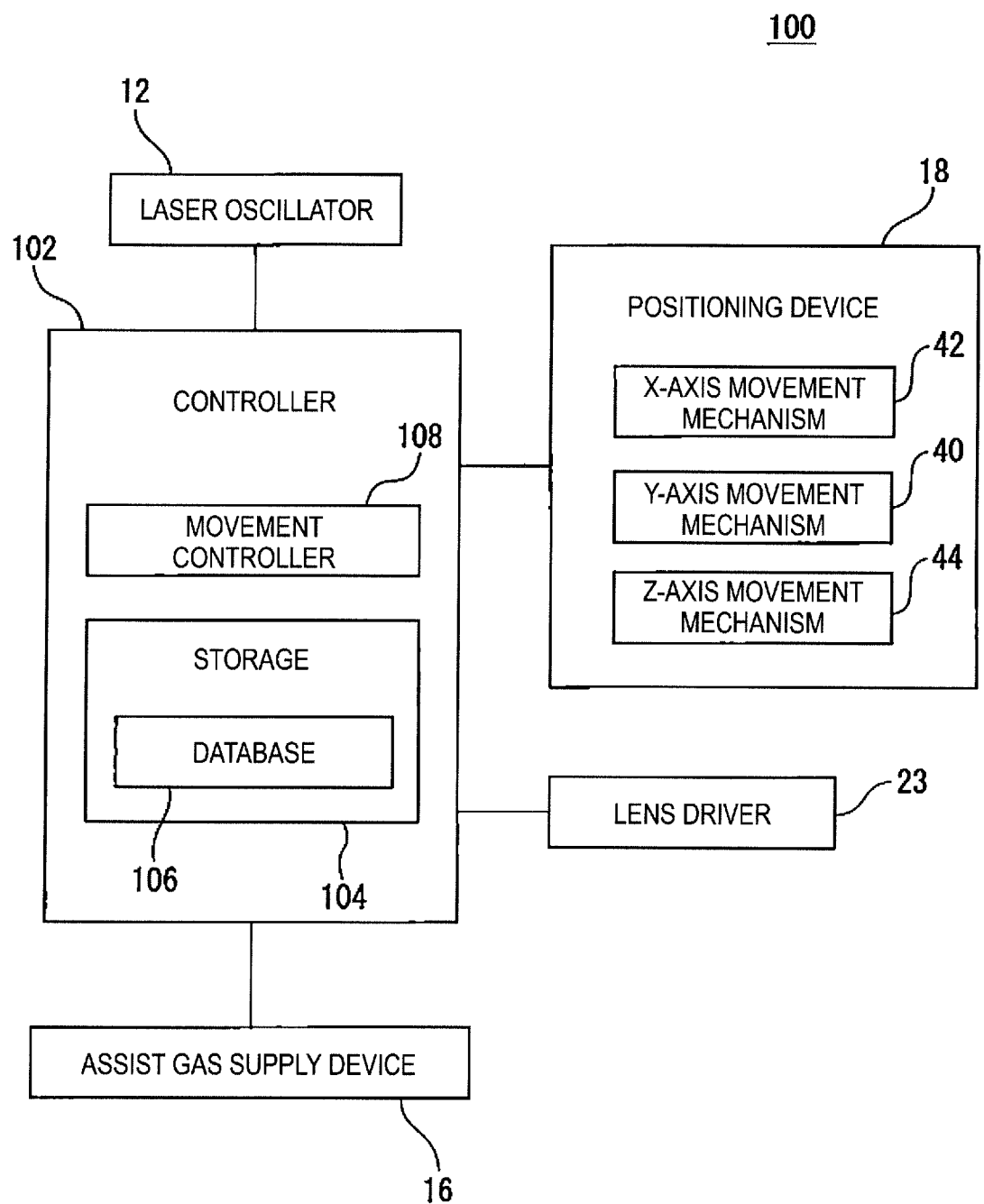
FIG. 11 is a block diagram of the laser processing system illustrated in FIG. 10.

Next, a laser processing system 100 will be described with reference to FIG. 10 and FIG. 11. The laser processing system 100 includes the laser oscillator 12, the laser processing head 14, the assist gas supply device 16, the positioning device 18, and a controller 102. The controller 102 includes a processor (not illustrated) and a storage 104, and controls the laser oscillator 12, the laser processing head 14, the assist gas supply device 16, and the positioning device 18. The storage 104 stores a database 106. The database 106 is one as shown in e.g. Table 1 or Table 2 described above.

Next, operation of the laser processing system 100 will be described. First, the controller 102 acquires setting values of the opening dimension ϕ of the emission opening 28 of the nozzle 24 to be used and the supply pressure $P_S$ of the assist gas from the assist gas supply device 16 to the chamber 29, and from the setting values of the opening dimension ϕ and the supply pressure $P_S$, reads out from the storage 104 and acquires the corresponding target distance $d_T$ in the database 106.

Then, the controller 102 operates the positioning device 18 so as to move the laser processing head 14 with respect to the workpiece W to disposes the nozzle 24 at a target position where a distance d between the emission opening 28 and the process portion S coincides with the target distance $d_T$. In this way, the target position is determined using the database 106, and the controller 102 functions as a movement controller 108 configured to control the positioning device 18 (i.e., the movement mechanisms 40, 42 and 44) so as to dispose the nozzle 24 at the target position.

The controller 102 then operates the assist gas supply device 16 so as to supply the assist gas to the chamber 29 at the supply pressure $P_S$, and the nozzle 24 emits the jet of the assist gas having the maximum points 32 and 34 of the velocity V. Then, the controller 102 operates the laser oscillator 12 so as to emit the laser beam from the emission opening 28, and operates the lens driver 23 so as to adjust the position of each optical lens 22 in the direction of the optical axis O such that the focal point of the emitted laser beam is positioned at the process portion S.

As a result, a through hole is formed at the process portion S of the workpiece W by the laser beam, and the controller 102 operates the positioning device 18 in accordance with a processing program stored in the storage 104 so as to perform the laser process (specifically, laser cutting) on the workpiece W while moving the nozzle 24 with respect to the workpiece W. At this time, the process portion S of the workpiece W is disposed in the first Mach disk region 33 (specifically, the position of the first maximum point 32) of the jet of the assist gas.

According to the laser processing system 100, it is possible to effectively make use of the assist gas so as to effectively blow out the material of the workpiece W melted by the laser beam. In addition, since the above-described generation of the plasma can be prevented, it is possible to improve finishing quality of the process portion S of the workpiece W, and prevent contamination of the component of the laser processing head 14.

Further, in the laser processing system 100, the target position where the nozzle 24 is to be disposed during the process on the workpiece W is determined using the database 106 of the position of the first maximum point 32.

According to this configuration, it is possible to quickly and easily position the nozzle 24 and the workpiece W at the target position to start the laser process.

Note that, in the laser processing system 100, the storage 104 may be provided as a separate element from the controller 102. In this case, the storage 104 may be built in an external device (a server, etc.) communicatively connected to the controller 102, or may be a storage medium (hard disk, flash memory, etc.) that can be externally attached to the controller 102. Furthermore, the controller 102 may fix the distance between the emission opening 28 and the workpiece W when laser-processing the workpiece W.

Figure 12:
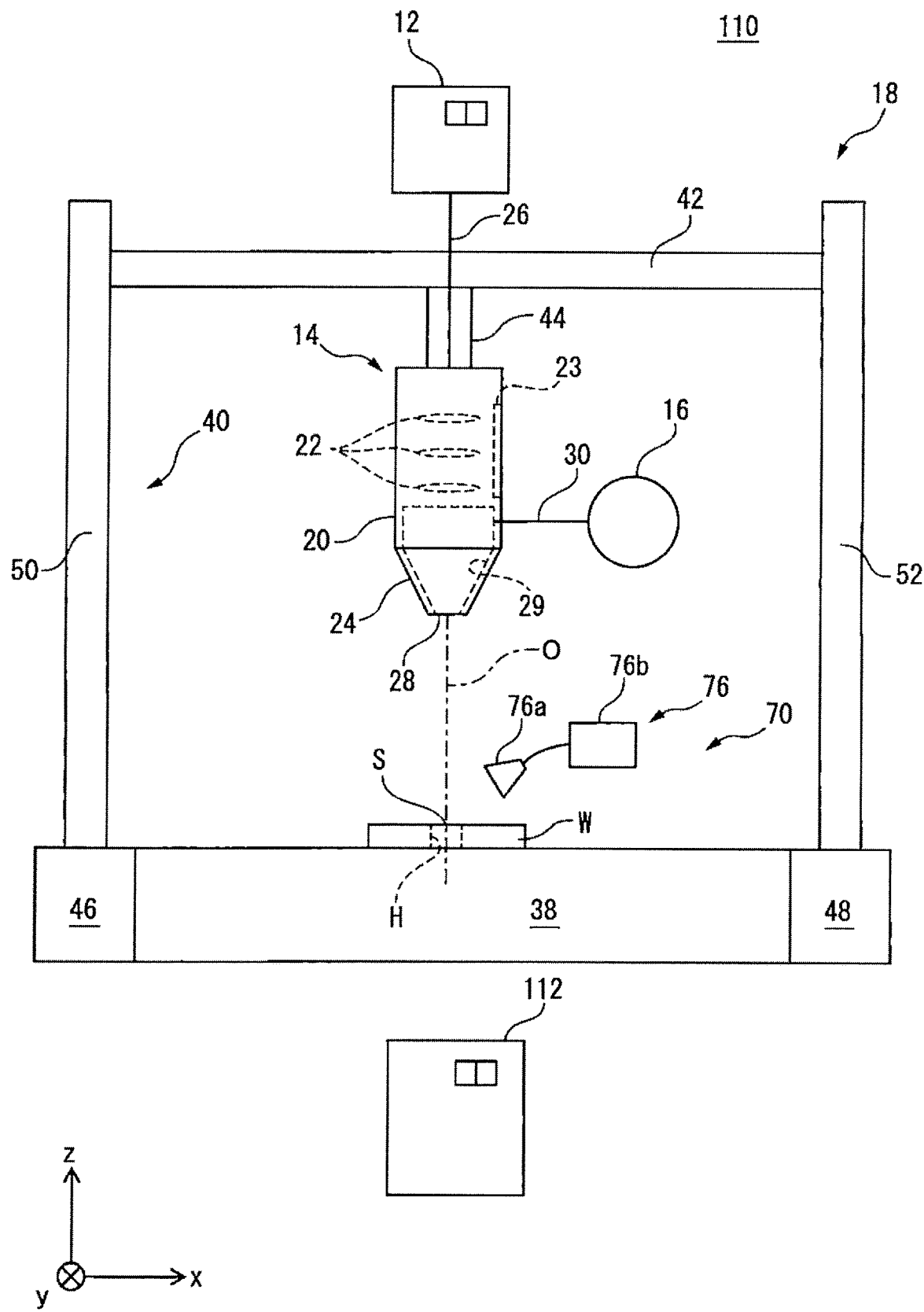
FIG. 12 is a diagram of yet another laser processing system.
Figure 13:
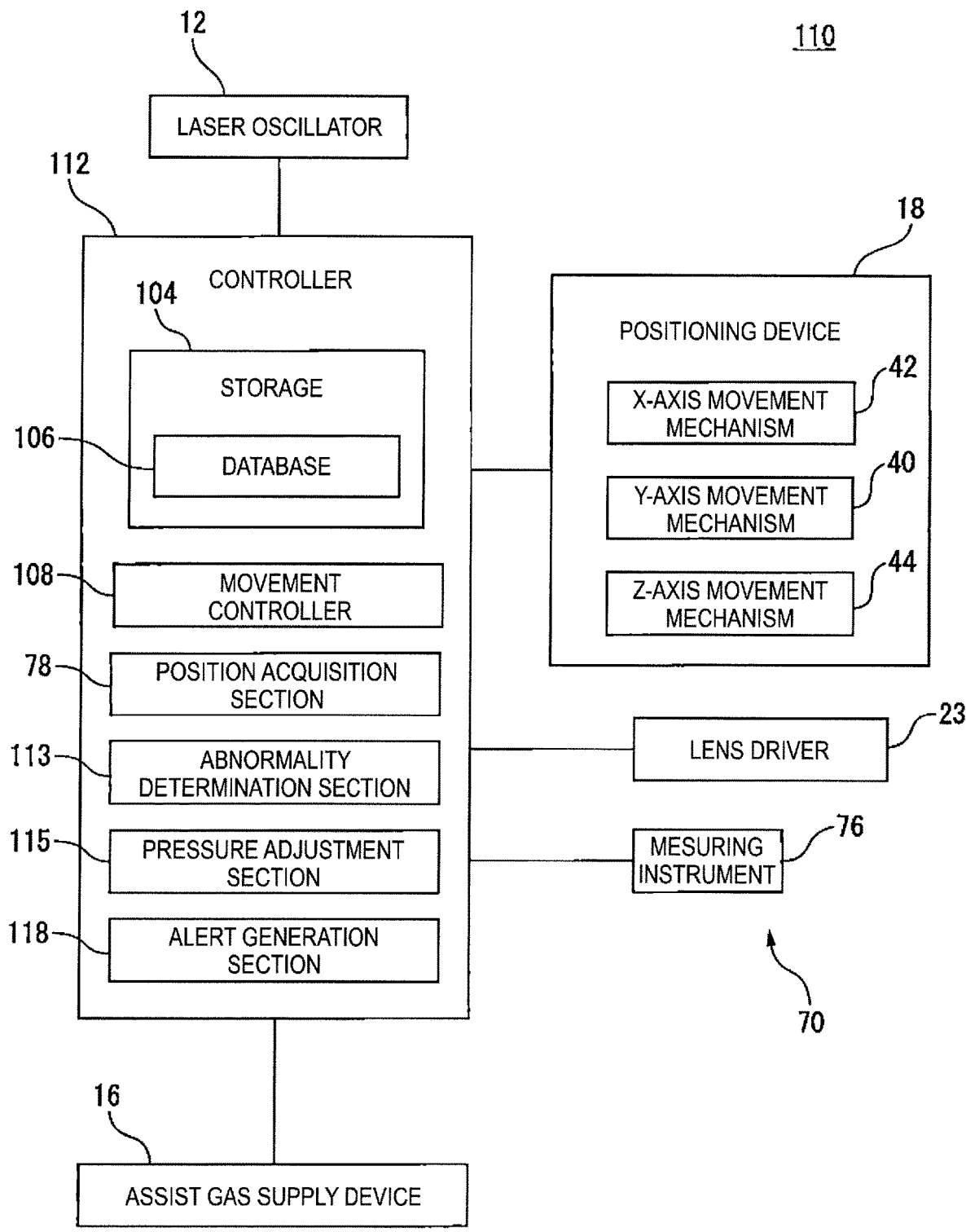
FIG. 13 is a block diagram of the laser processing system illustrated in FIG. 12.

Next, a laser processing system 110 will be described with reference to FIG. 12 and FIG. 13. The laser processing system 110 includes the laser oscillator 12, the laser processing head 14, the assist gas supply device 16, the positioning device 18, the measuring instrument 76, and a controller 112.

The controller 112 includes a processor and the storage 104, and controls the laser oscillator 12, the laser processing head 14, the assist gas supply device 16, the positioning device 18, and the measuring instrument 76. The database 106 as shown in above Table 2 is stored in the storage 104. The controller 112 functions as the above-described position acquisition section 78. Accordingly, in the laser processing system 110, the positioning device 18, the measuring instrument 76, and the controller 112 constitute the jet observation apparatus 70 described above.

Figure 14:
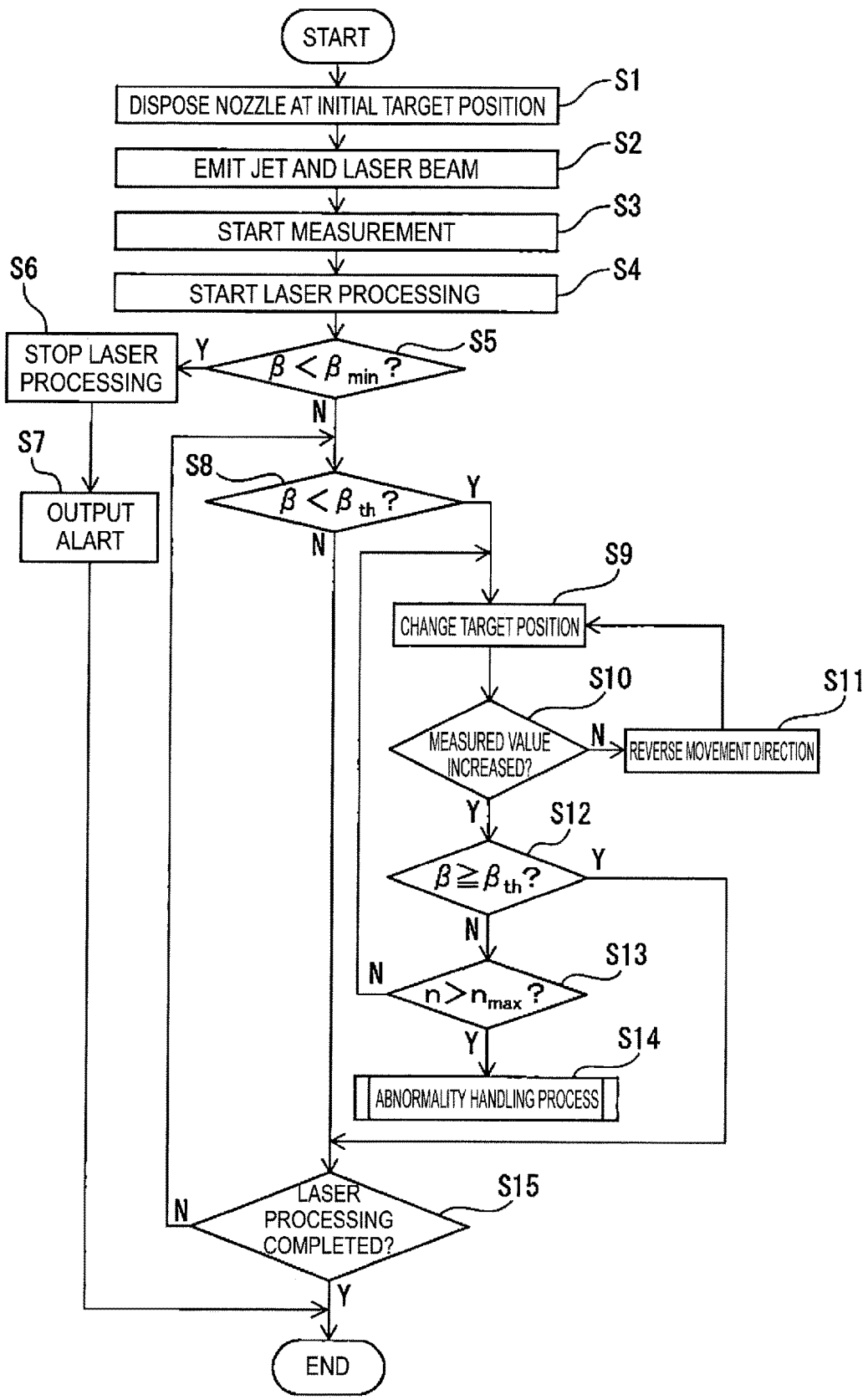
FIG. 14 is a flowchart illustrating an example of an operation flow of the laser processing system illustrated in FIG. 12.

Then, operation of the laser processing system 110 will be described with reference to FIG. 14. A flow illustrated in FIG. 14 is started when the controller 112 receives a processing start command from an operator, a host controller, or a processing program.

In step S1, the controller 112 disposes the nozzle 24 at an initial target position with respect to the process portion S. Specifically, the controller 112 acquires the setting values of the opening dimension ϕ of the emission opening 28 of the nozzle 24 to be used and the supply pressure $P_S$ of the assist gas to the chamber 29, and from the setting values of the opening dimension ϕ and the supply pressure $P_S$, reads out and acquires the corresponding target distance $d_T$ in the database 106. Then, the controller 112 functions as the movement controller 108 and operates the positioning device 18 so as to move the laser processing head 14 with respect to the workpiece W to dispose the nozzle 24 at the initial target position where a distance d between the emission opening 28 and the process portion S coincides with the target distance $d_T$.

In step S2, the controller 112 supplies the assist gas from the assist gas supply device 16 to the chamber 29 at the supply pressure $P_S$, so as to emit the jet of the assist gas from the emission opening 28. Then, the controller 112 operates the laser oscillator 12 so as to emit the laser beam from the emission opening 28, and operates the lens driver 23 so as to adjust the position of each optical lens 22 in the direction of the optical axis O such that the focal point of the emitted laser beam is positioned at the process portion S. As a result, a through hole H (FIG. 12) is formed in the workpiece W, and the jet passes through the through hole H. This through hole H corresponds to the above-described through hole 74a.

In step S3, the controller 112 starts measurement by the measuring instrument 76. Specifically, the controller 112 sends a command to the measuring instrument 76, and in response to the command, the measuring instrument 76 consecutively (e.g., at a predetermined period) measures the sound pressure SP or the frequency f of a sound generated by the jet emitted from the emission opening 28 of the nozzle 24 impinging on the workpiece W when passing through the through hole H.

The controller 112 functions as the position acquisition section 78 to sequentially acquires the output data β of the sound pressure SP or the frequency f from the measuring instrument 76, as the information representing the position $x_1$ of the first maximum point 32, and stores the output data β in the storage 104. As described in connection with the above jet observation apparatus 70, the output data β including the first peak value $β_{max1}$ corresponds to the information representing the position $x_1$ of the first maximum point 32.

In step S4, the controller 112 starts the laser process. Specifically, the controller 112 operates the positioning device 18 in accordance with a processing program so as to move the nozzle 24 with respect to the workpiece W, along with which, the controller 112 performs the laser process (laser cutting) on the workpiece W by the laser beam emitted from the emission opening 28.

In step S5, the controller 112 determines whether or not the output data β most-recently acquired by the measuring instrument 66 is smaller than a predetermined lower limit value $β_{min}$. This lower limit value $β_{min}$ defines a boundary for determining whether or not the velocity V of the jet emitted from the nozzle 24 is abnormally small, and is predetermined by an operator.

In this respect, if clogging of the emission opening 28 or abnormality in operation (e.g., out of gas) of the assist gas supply device 16 occurs, the velocity V of the jet may be significantly reduced below a reference value. In this case, the output data β acquired by the measuring instrument 66 differs from (specifically, is smaller than) reference data measured by the measuring instrument 66 when the jet is normally emitted from the nozzle 24.

The controller 112 determines whether or not the output data β is smaller than the lower limit value $β_{min}$, whereby determining whether or not the output data β is different from the reference data. As described above, the controller 112 functions as an abnormality determination section 113 configured to determine whether or not the output data β is different from the reference data.

When the controller 112 determines that the output data β is smaller than the lower limit value $β_{min}$ (i.e., determines YES), it proceeds to step S6. On the other hand, when the controller 112 determines that the output data β is equal to or greater than the lower limit value $β_{min}$ (i.e., determines NO), it proceeds to step S8. In step S6, the controller 112 sends a command to the laser oscillator 12 so as to stop a laser oscillation operation, whereby stopping the laser process on the workpiece W.

In step S7, the controller 112 outputs an alert. For example, the controller 112 generates an alert signal in the form of sound or image, which indicates "There is abnormality in emission of assist gas. Check opening dimension of nozzle or supply pressure of assist gas". Then, the controller 112 outputs the alert via a speaker or a display (not illustrated). Thus, the controller 112 functions as an alert generation section 118 configured to generate the alert.

The speaker or the display may be provided at the controller 112, or may be provided outside the controller 112. The operator can intuitively recognize from the alert that there is abnormality in the nozzle 24 or the assist gas supply, and can replace the nozzle 24 or take measures for the operating abnormality (e.g., out of gas) of the assist gas supply device 16. After carrying out this step S7, the controller 112 ends the flow illustrated in FIG. 14.

In step S8, the controller 112 determines whether or not the output data β acquired most-recently by the measuring instrument 76 is smaller than a predetermined threshold value $β_{th}$. This threshold value $β_{th}$ is greater than the above-described lower limit value $β_{min}$. As an example, the threshold value $β_{th}$ may be set as a value obtained by multiplying the first peak value $β_{max1}$ stored in the database 106 by a predetermined coefficient a (0<a<1).

Figure 16:
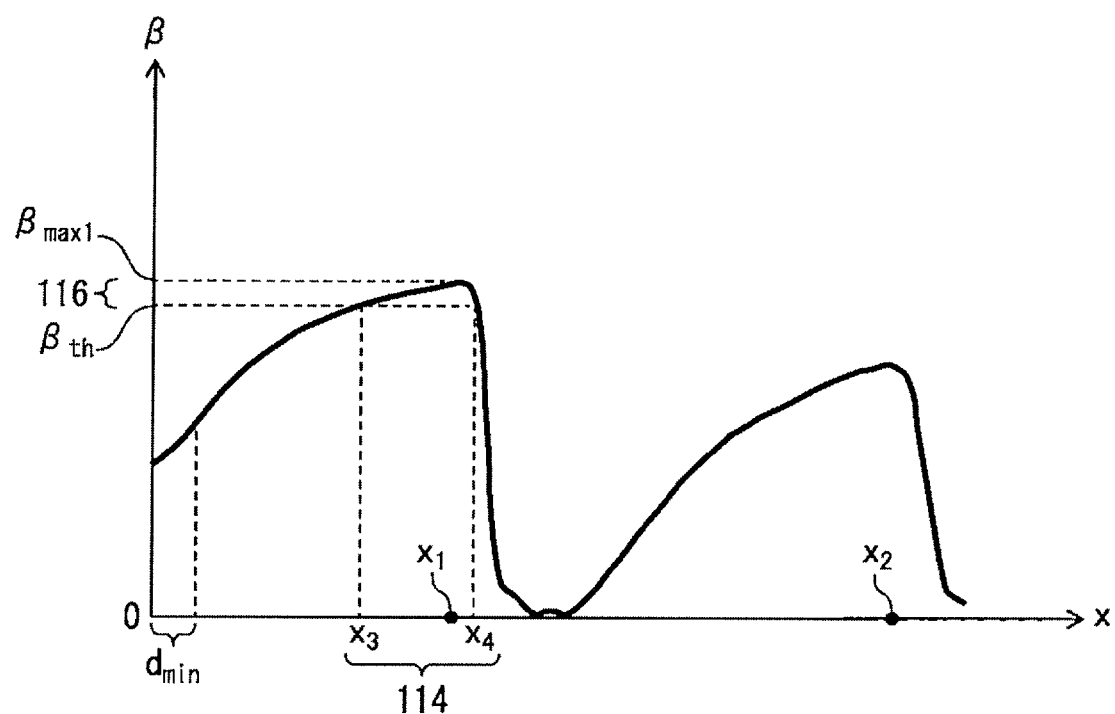
FIG. 16 is a graph schematically showing a relationship between output data of a measuring instrument illustrated in FIG. 12 and a distance from an emission opening.

For example, if the database 106 shown in above Table 2 is used, the opening dimension ϕ is set as ϕ=1.0 mm, the supply pressure $P_S$ is set as $P_S$=2.0 MPa, and the coefficient a is set as a=0.95, the threshold value $β_{th}$=120 [dB]× 0.95=114 [dB] is obtained. A relationship between the output data β and position x of the process portion S of the workpiece W with respect to the emission opening 28 is schematically shown in FIG. 16. The relationship between the output data β and the position x corresponds to the graph illustrated in FIG. 3.

A range 116 from the threshold value $β_{th}$ to the first peak value $β_{max1}$ corresponds to a position range 114 between a position $x_3$ and a position $x_4$. The position $x_1$ of the first maximum point 32 is within the position range 114. In this respect, in above-described step S1, the nozzle 24 is disposed at the initial target position where the distance d between the emission opening 28 and the process portion S coincides with the target distance $d_T$. Accordingly, just after step S1, the process portion S appears to be disposed at or near the position $x_1$ of the first maximum point 32.

However, while the laser process on the workpiece W is carried out, the distance d between the emission opening 28 and the process portion S may change due to some factor. As such factor, there is a case where a stepped portion is formed at the process portion of the workpiece W, whereby the distance d changes, for example. If the distance d changes in this way, the output data β of the measuring instrument 76 may be below the threshold value $β_{th}$.

When the controller 112 determines that the output data β is smaller than the threshold value $β_{th}$ (i.e., determines YES) in this step S8, it proceeds to step S9. On the other hand, when the controller 112 determines that the output data β is equal to or greater than the threshold value $β_{th}$ (i.e., determines NO), it proceeds to step S15.

In step S9, the controller 112 changes a target position of the nozzle 24. Specifically, the controller 112 changes the target position of the nozzle 24 set at the start of this step S9 to a new target position moved in the z-axis negative direction or the z-axis positive direction. Then, the controller 112 functions as the movement controller 108, and operates the positioning device 18 so as to move the nozzle 24 in the z-axis negative direction or the z-axis positive direction in order to dispose the nozzle 24 at the new target position. As a result, the nozzle 24 moves closer to or away from the workpiece W.

In step S10, the controller 112 determines whether or not the output data β acquired by the measuring instrument 66 after step S9 increases from the output data β acquired by the measuring instrument 66 immediately before step S9. In this respect, if the output data β decreases as a result of the movement of the nozzle 24 in step S9, the position of the workpiece W (specifically, the process portion S) is separated away from the position range 114 in the graph shown in FIG. 16. In this case, in order to bring the position of the workpiece W within the position range 114, it is necessary to reverse the direction in which the nozzle 24 is to be moved in step S9.

On the other hand, if the output data β increases as a result of the movement of the nozzle 24 in step S9, the position of the workpiece W approaches the position $x_1$ in the graph shown in FIG. 16. In this case, it is not necessary to change the direction in which the nozzle 24 is to be moved in step S9.

In this step S10, when the controller 112 determines that the output data β acquired by the measuring instrument 66 just after step S9 increases from the output data β acquired by the measuring instrument 66 immediately before step S9 (i.e., determines YES), it proceeds to step S12. On the other hand, when the controller 112 determines that the output data β acquired by the measuring instrument 66 just after step S9 decreases from the output data β acquired by the measuring instrument 66 immediately before step S9 (i.e., determines NO), it proceeds to step S11.

In step S11, the controller 112 reverses the direction in which the nozzle 24 is to be moved. For example, if the nozzle 24 has been moved in the z-axis negative direction in most-recently executed step S9, the controller 112 reverses the direction in which the nozzle 24 is to be moved in next step S9 to the z-axis positive direction. Then, the controller 112 returns to step S9.

In step S12, the controller 112 determines whether or not the output data β most-recently acquired by the measuring instrument 76 is equal to or greater than the threshold value $β_{th}$. When the controller 112 determines that the output data β is equal to or greater than the threshold value $β_{th}$ (i.e., determines YES), it proceeds to step S15. On the other hand, when the controller 112 determines that the output data β is still smaller than the threshold value $β_{th}$ (i.e., determines NO), it proceeds to step S13.

In step S13, the controller 112 determines whether or not the number of times n, for which the controller 112 determines NO in step S12, exceeds a predetermined maximum number of times $n_{max}$. This maximum number of times $n_{max}$ is predetermined by the operator as an integer of 2 or greater (e.g., $n_{max}$=10). When the controller 112 determines that the number of times n exceeds the maximum number of times $n_{max}$ (i.e., determines YES), it proceeds to step S14. On the other hand, when the controller 112 determines that the number of times n does not exceed the maximum number of times $n_{max}$ (i.e., determines NO), it returns to step S9.

In this way, by carrying out a loop of steps S9 to S13 in FIG. 14, the controller 112 changes the target position of the nozzle 24 such that the output data β of the measuring instrument 76 is within the range 116 of output data which represents the position range 114, during the process on the workpiece W, and performs feedback control for the positioning device 18 in accordance with the changed target position so as to move the nozzle 24.

That is, the target position of the nozzle 24 is determined as a predetermined range, based on the first peak value $β_{max1}$ of the output data β that represents the position $x_1$ of the first maximum point 32. By this feedback control, the process portion S can be continuously disposed in the first Mach disk region 33 during the process on the workpiece W. Thus, the first Mach disk region 33 in the laser processing system 110 can be defined as a region of the position range 114 defined by the threshold value $β_{th}$.

On the other hand, when the controller 112 determines YES in step S13, in step S14, the controller 112 carries out an abnormality handling process. If the output data β does not satisfy $β≥β_{th}$ even though the feedback control in steps S9 to S13 is repeatedly carried out for the number of times $n_{max}$, the above-described abnormality such as the clogging or the out of gas may possibly occur.

In this respect, the characteristic shown in FIG. 16 is reference data measured by the measuring instrument 76 when the jet is normally emitted from the emission opening 28 without occurrence of the abnormality, wherein the first peak value $β_{max1}$ constitutes the reference data, and the threshold value $β_{th}$ is set for the reference data. Therefore, the range 116 in FIG. 16 is a range of output data which represents the position range 114 and which is determined based on the reference data.

If the controller 112 determines YES in step S13 by functioning as the abnormality determination section 113, the controller 112 determines that the output data β of the measuring instrument 76 is different from the reference data, and executes the abnormality handling process in step S14. This step S14 will be described with reference to FIG. 15. Note that, in the flow illustrated in FIG. 15, processes similar to those of the flow illustrated in FIG. 14 are assigned the same step numbers, and redundant descriptions thereof will be omitted.

In step S21, the controller 112 sends a command to the assist gas supply device 16 so as to change the supply pressure $P_S$ of the assist gas to the chamber 29. The controller 112 increases the supply pressure $P_S$ by a predetermined pressure (e.g., 0.2 MPa) in a stepwise manner, each time the controller 112 carries out this step S21. In this way, the controller 112 functions as a pressure adjustment section 115 configured to change the supply pressure $P_S$.

Then, the controller 112 carries out the above-described step S12 to determine whether the output data β most-recently acquired by the measuring instrument 76 is equal to or greater than the threshold value $β_{th}$. The controller 112 proceeds to step S15 in FIG. 14 when determining YES, while it proceeds to step S22 when determining NO.

Figure 15:
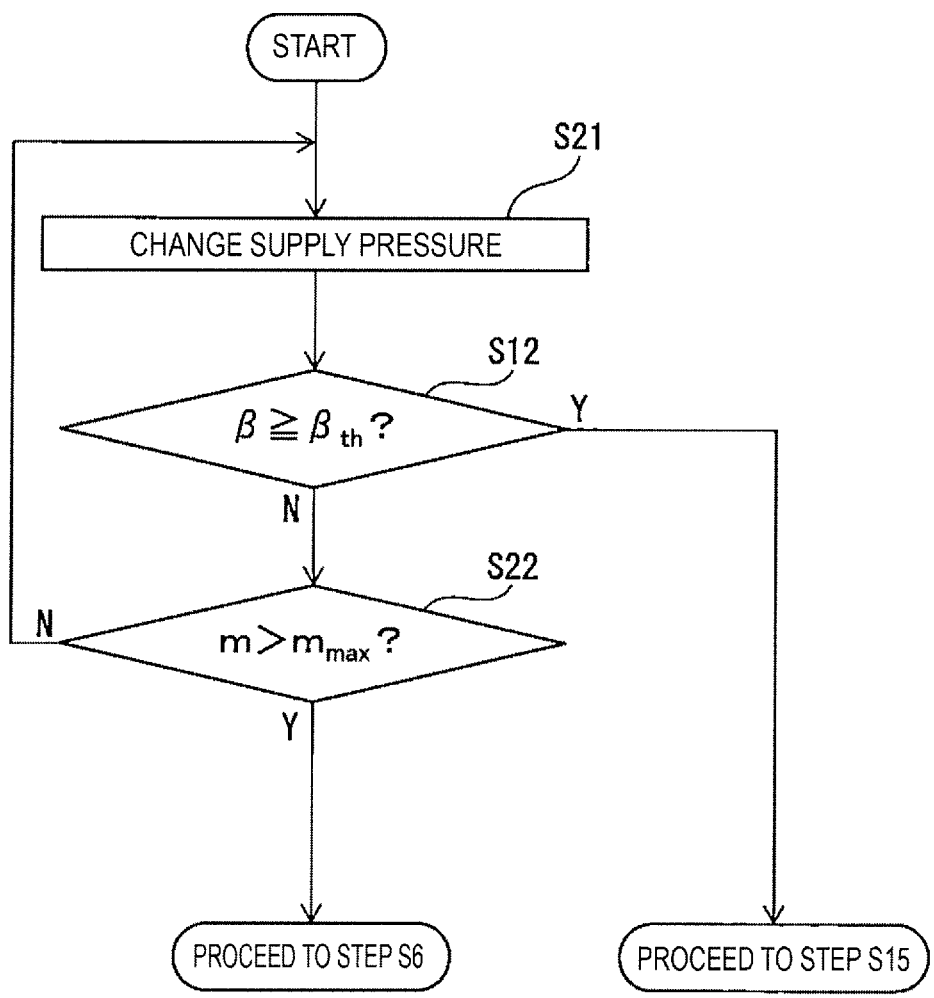
FIG. 15 is a flowchart illustrating an example of the flow of Step S14 in FIG. 14.

In step S22, the controller 112 determines whether or not the number of times m, for which the controller 112 determines NO in step S12 in FIG. 15, exceeds a predetermined maximum number of times $m_{max}$. This maximum number of times $m_{max}$ is predetermined by the operator as an integer of 2 or greater (e.g., $m_{max}$=5). When the controller 112 determines that the number of times m exceeds the maximum number of times $m_{max}$ (i.e., determines YES), it proceeds to step S6 in FIG. 14. On the other hand, when the controller 112 determines that the number of times m does not exceed the maximum number of times $m_{max}$ (i.e., determines NO), it returns to step S21.

Referring again to FIG. 14, in step S15, the controller 112 determines whether or not the laser process on the workpiece W has been completed, based on e.g. the processing program. When the controller 112 determines that the laser process has been completed (i.e., determines YES), the controller 112 sends a command to the laser oscillator 12 so as to stop the laser oscillation operation, and ends the flow illustrated in FIG. 14. On the other hand, when the controller 112 determines that the laser process has not been completed (i.e., determines NO), it returns to step S8.

As described above, the controller 112 performs the feedback control of the position of the nozzle 24 such that the process portion S is continuously disposed in the first Mach disk region 33, based on the output data β acquired by the measuring instrument 76 during the process on the workpiece W. According to this configuration, even when the distance d between the emission opening 28 and the process portion S changes due to some factor, it is possible to perform the laser process on the workpiece W in a state where the process portion S is disposed in the first Mach disk region 33. Thus, the assist gas can be effectively utilized.

Furthermore, the controller 112 determines abnormality of the emitted jet by performing step S14. If abnormality such as clogging or out of gas occurs, the velocity V of the jet emitted from the emission opening 28 hardly changes even when the supply pressure $P_S$ from the assist gas supply device 16 to the chamber 29 is changed.

In this case, the output data β of the measuring instrument 76 also hardly changes, and accordingly, the output data β does not satisfy β≥$β_{th}$ (i.e., it is not determined YES in step S12 in FIG. 15) even when a loop of steps S21 to S22 in FIG. 15 is repeatedly carried out.

If the output data β does not satisfy β≥$β_{th}$ even after the controller 112 repeatedly performs the loop of steps S21 to S22 for the predetermined number of times $m_{max}$ by functioning as the abnormality determination section 113, the controller 112 determines that the output data β is different from the reference data, and outputs the alert message in step S7 in FIG. 14. According to this configuration, the operator can intuitively recognize that there is abnormality in the nozzle 24 or the assist gas supply, and replace the nozzle 24 or take measures for the abnormality (out of gas) in operation of the assist gas supply device 16.

On the other hand, a case may occur in which the velocity V of the jet emitted from the emission opening 28 decreases slightly below the reference value due to minor abnormality, such as an error of the opening dimension or a length in the z-axis direction of the emission opening 28, inclination of the emission opening 28 with respect to the z-axis, or a design dimension error of an interior space of the nozzle 24 (chamber 29). In the case of such minor abnormality, the velocity of the jet varies in response to change in the supply pressure $P_s$, but the output data β may not satisfy β≥$β_{th}$, and it may be determined YES in step S13 even when the feedback control of steps S9 to S13 is repeatedly carried out.

According to the laser processing system 110, in step S14, the controller 112 continues the process on the workpiece W if the output data β satisfies β≥$β_{th}$ by performing step S21. According to this configuration, even when the velocity V of the jet decreases below the reference value due to the minor abnormality such as a dimensional error, it is possible to continue the process on the workpiece W in a state in which the jet is blown onto the process portion S at the sufficiently large velocity V, by changing (specifically increasing) the supply pressure $P_s$.

Note that, each time the controller 112 determines YES in step S12 in a first laser process, the controller 112 may sequentially store the distance d between the emission opening 28 and the process portion S at this point of time. Then, the controller 112 may set the initial target position in step S1 of a second laser process to be carried out next to the first laser process, based on the distance d stored in the first laser process. For example, the controller 112 may set, as the initial target position of the second laser process, an average value of the distance d or the last stored distance d, which has been stored in the first laser process.

Note that, as modification of the laser processing system 110, the above-described measuring instrument 66 may be applied, instead of the measuring instrument 76. In this case, the measuring instrument 66 is configured to measure the velocity V of the jet in a non-contact manner, at the position of the process portion S (or a position slightly displaced from the process portion S toward the emission opening 28). The measuring instrument 66 thus applied to the laser processing system 110, the positioning device 18, and the controller 112 constitute the jet observation apparatus 60 described above.

In this modification, the controller 112 can carry out the flows illustrated in FIG. 14 and FIG. 15 based on the output data α of the measuring instrument 66 instead of the output data β, and perform the laser process on the workpiece W in a state where the workpiece W is disposed in the first Mach disk region 33.

Figure 17:
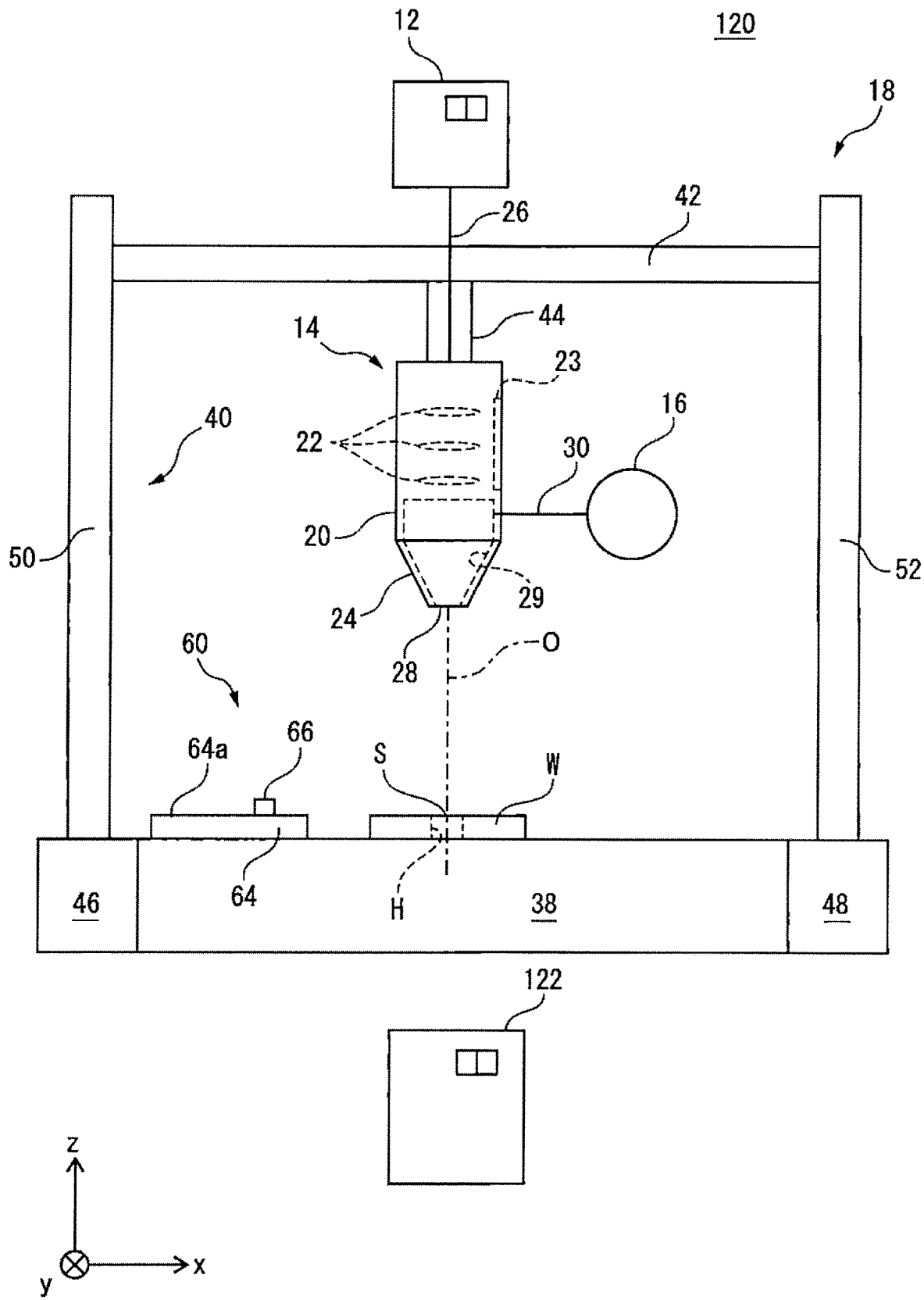
FIG. 17 is a diagram of yet another laser processing system.
Figure 18:
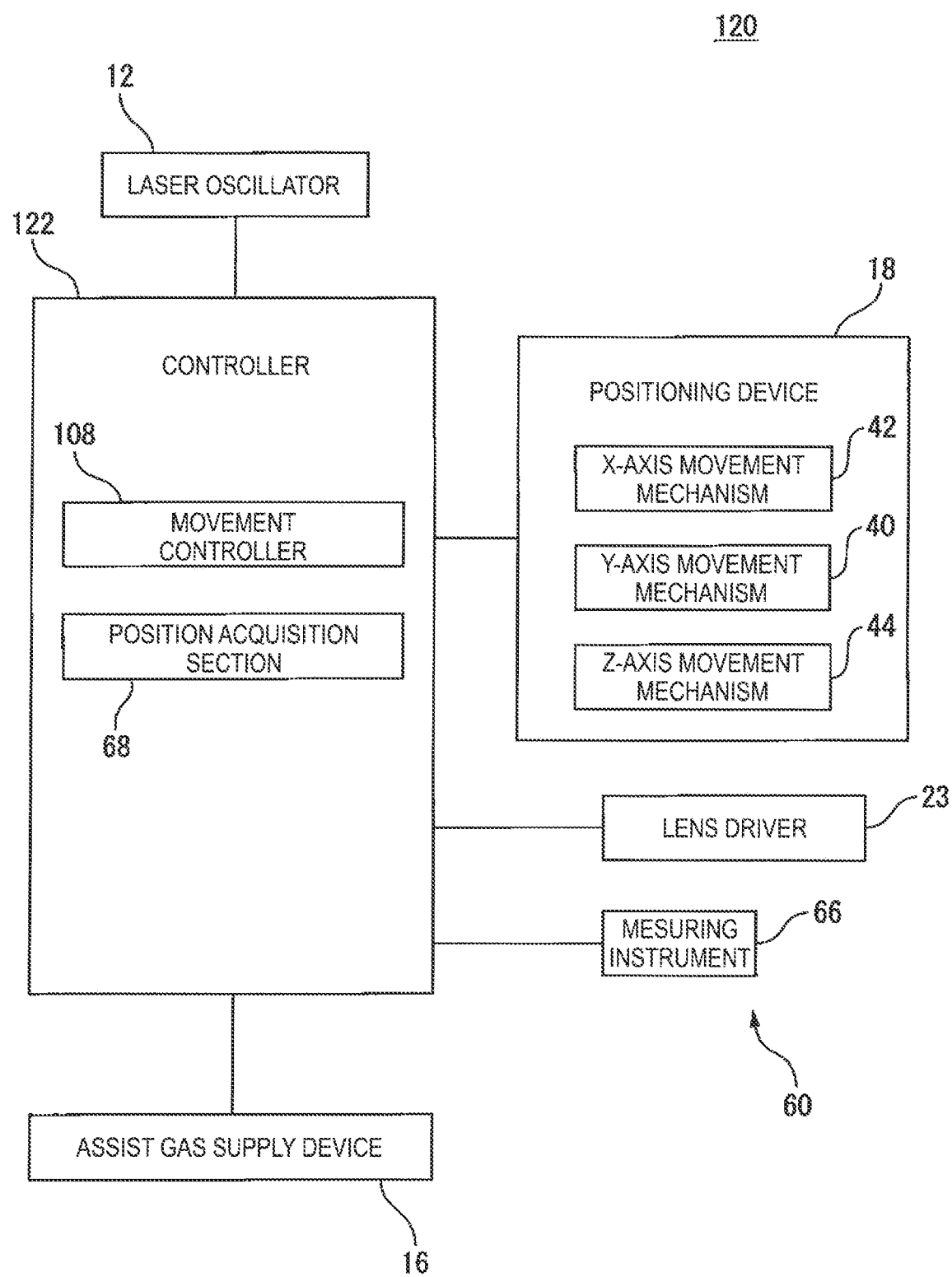
FIG. 18 is a block diagram of the laser processing system illustrated in FIG. 17.

Next, a laser processing system 120 will be described with reference to FIG. 17 and FIG. 18. The laser processing system 120 includes the laser oscillator 12, the laser processing head 14, the assist gas supply device 16, the positioning device 18, the dummy workpiece 64, the measuring instrument 66, and a controller 122.

The controller 122 includes a processor and a storage (not illustrated), and controls the laser oscillator 12, the laser processing head 14, the assist gas supply device 16, the positioning device 18, and the measuring instrument 66. The controller 122 functions as the position acquisition section 68 described above. Thus, the positioning device 18, the dummy workpiece 64, the measuring instrument 66, and the controller 122 constitute the above-described jet observation apparatus 60.

Next, operation of the laser processing system 120 will be described. First, the controller 122 acquires the information representing the position $x_1$ of the first maximum point 32. Specifically, the controller 122 functions as the position acquisition section 68 to acquire the target distance $d_T$ from the first peak value $α_{max1}$ of the output data α of the measuring instrument 66, using the method described in connection with the above jet observation apparatus 60.

Then, the controller 122 disposes the nozzle 24 at the target position. Specifically, the controller 122 functions as the movement controller 108 and operates the positioning device 18 so as to move the laser processing head 14 with respect to the workpiece W to dispose the nozzle 24 at the target position where the distance d between the emission opening 28 and the process portion S coincides with the target distance $d_T$.

Then, the controller 122 operates the assist gas supply device 16 so as to supply the assist gas to the chamber 29 at the supply pressure $P_S$ to emit the jet of the assist gas from the emission opening 28. Further, the controller 122 operates the laser oscillator 12 so as to emit the laser beam from the emission opening 28, and operates the lens driver 23 so as to adjust the position of the optical lens 22 in the direction of the optical axis O such that the focal point of the emitted laser beam is positioned at the process portion S.

In this state, the controller 122 carries out the laser process (laser cutting) on the workpiece W while operating the positioning device 18 in accordance with the processing program so as to move the nozzle 24 with respect to the workpiece W. At this time, the process portion S of the workpiece W is disposed in the first Mach disk region 33 of the jet of the assist gas.

As described above, the controller 122 acquires the position $x_1$ of the first maximum point 32 by the jet observation apparatus 60 before processing the workpiece W, and carries out the laser process on the workpiece W along with disposing the nozzle 24 at the target position determined based on the acquired position $x_1$ of the first maximum point 32. According to this configuration, since it is possible to dispose the process portion S in the first Mach disk region 33 during the process on the workpiece W, the assist gas can be effectively utilized.

In addition, according to the laser processing system 120, even when the opening dimension ϕ of the emission opening 28 and the supply pressure $P_S$ of the assist gas are unknown, it is possible to acquire the position $x_1$ of the first maximum point 32 by the jet observation apparatus 60 before processing the workpiece W, and determine the target position of the nozzle 24 based on the position $x_1$ of the first maximum point 32.

Figure 19:
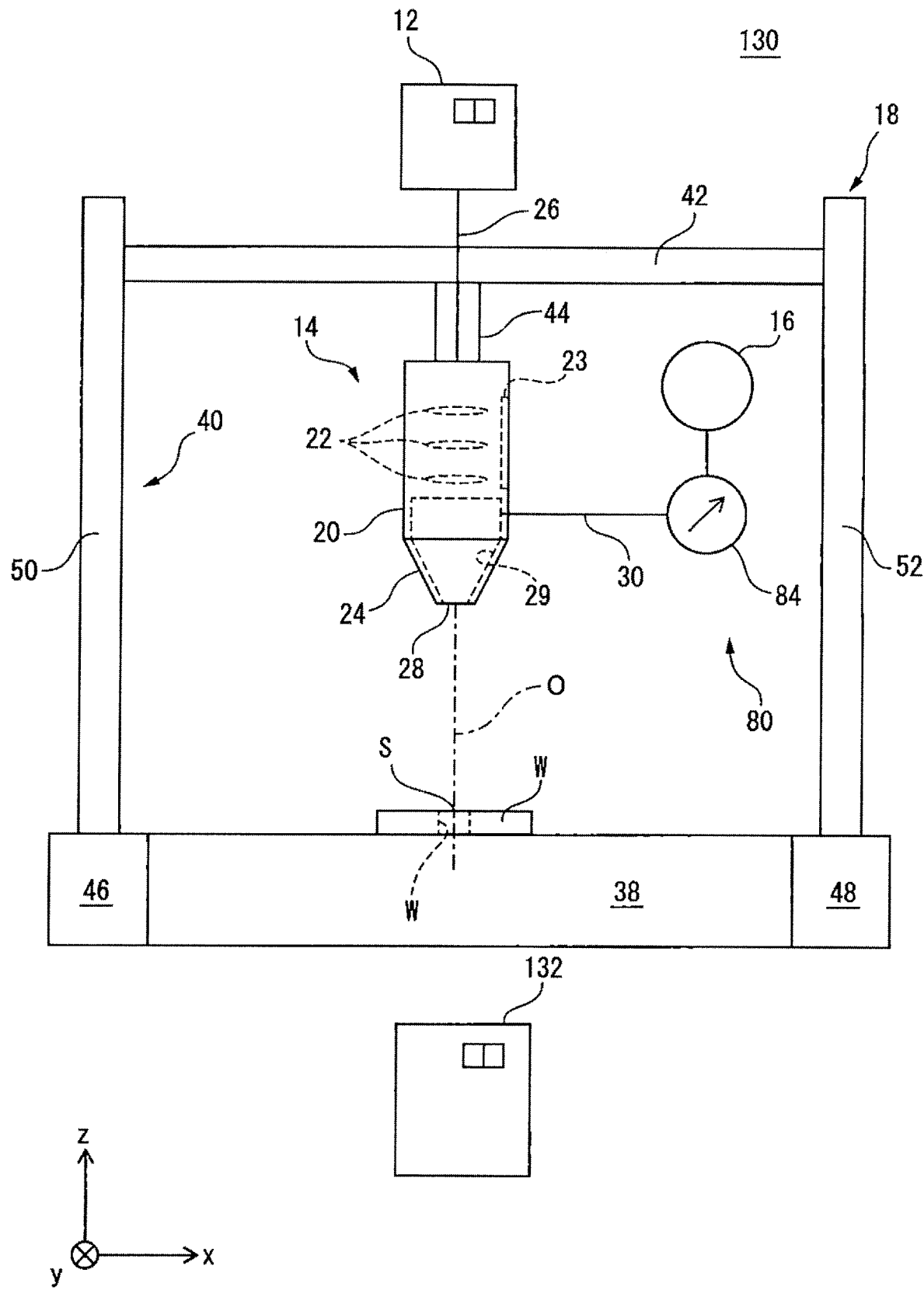
FIG. 19 is a diagram of yet another laser processing system.
Figure 20:
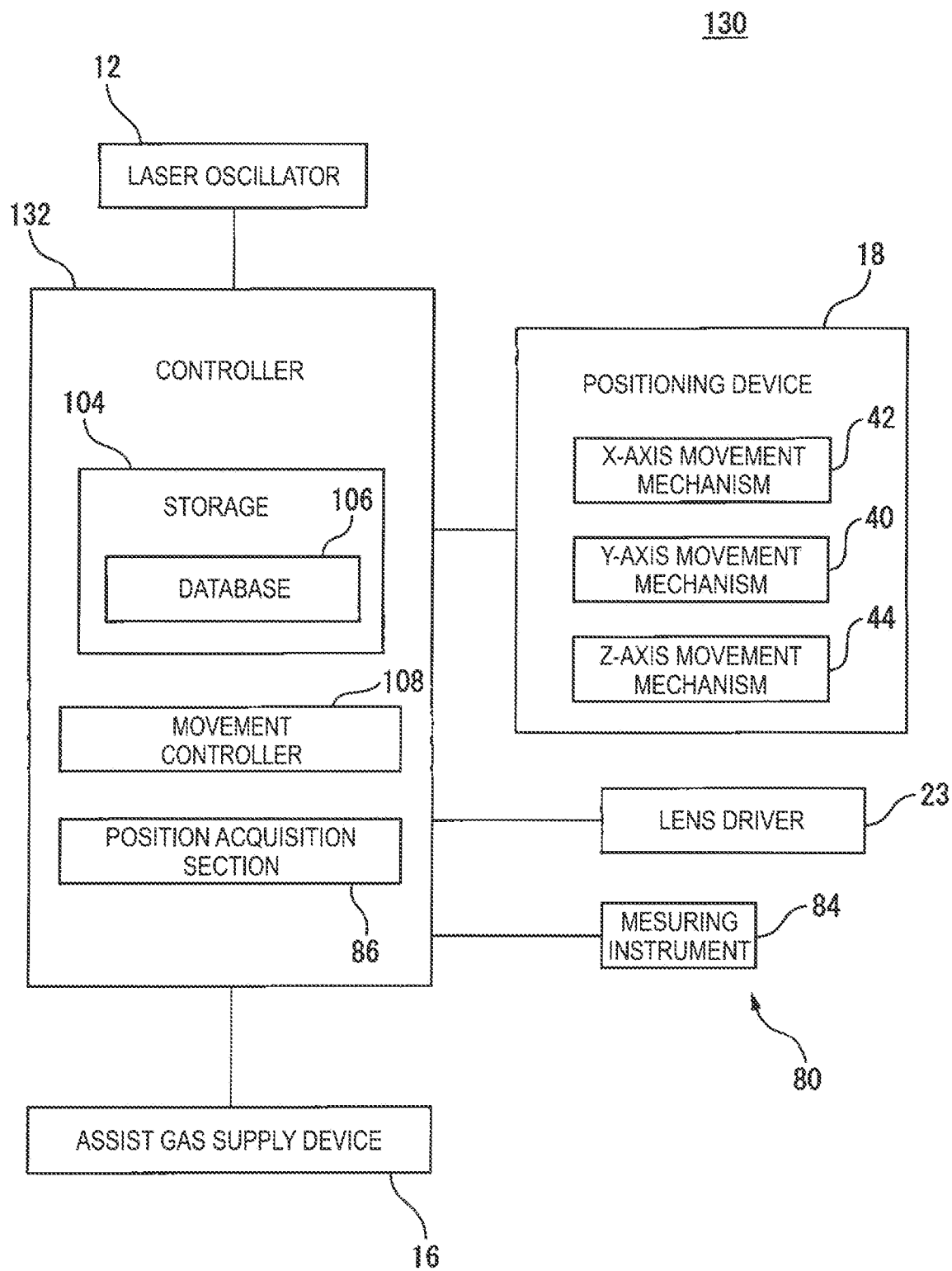
FIG. 20 is a block diagram of the laser processing system illustrated in FIG. 19.

Next, a laser processing system 130 will be described with reference to FIG. 19 and FIG. 20. The laser processing system 130 includes the laser oscillator 12, the laser processing head 14, the assist gas supply device 16, the positioning device 18, the measuring instrument 84, and a controller 132.

The controller 132 includes a processor and the storage 104, and controls the laser oscillator 12, the laser processing head 14, the assist gas supply device 16, the positioning device 18, and the measuring instrument 84. The database 106 as shown in above Table 1 is stored in the storage 104. The controller 132 functions as the above-described position acquisition section 86. Thus, the measuring instrument 84 and the controller 132 constitute the jet observation apparatus 80 described above.

Figure 21:
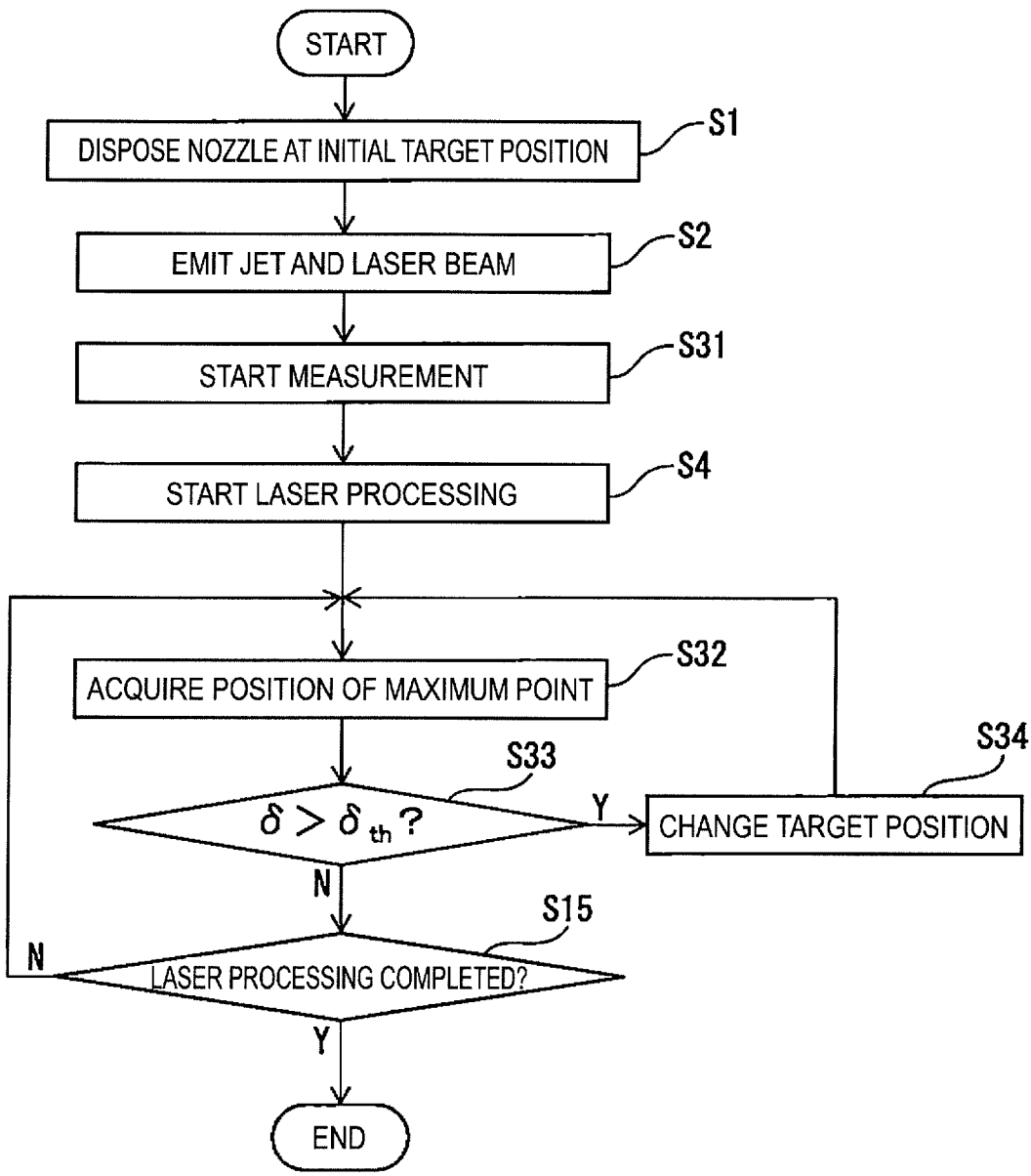
FIG. 21 is a flowchart illustrating an example of an operation flow of the laser processing system illustrated in FIG. 19.

Next, operation of the laser processing system 130 will be described with reference to FIG. 21. A flow illustrated in FIG. 21 is started when the controller 132 receives a processing start command from an operator, a host controller, or a processing program. Note that, in the flow illustrated in FIG. 21, processes similar to those of the flow illustrated in FIG. 14 are assigned the same step numbers, and redundant descriptions thereof will be omitted.

After performing steps S1 and S2, in step S31, the controller 132 starts measurement of the supply flow rate $V_V$ of the assist gas supplied from the assist gas supply device 16 to the chamber 29. Specifically, the controller 132 sends a command to the measuring instrument 84 so as to cause the measuring instrument 84 to measure the supply flow rate $V_V$, consecutively (e.g., at a predetermined period). In addition, the controller 132 starts measurement of the distance d between the emission opening 28 and the process portion S. As described above, the distance d can be acquired using a known gap sensor or the like.

After step S4, in step S32, the controller 132 acquires the position $x_1$ of the first maximum point 32. Specifically, the controller 132 functions as the position acquisition section 86 to calculate the distance $d_c$ from the emission opening 28 to the first maximum point 32, as the information of the position $x_1$ of the first maximum point 32, using the output data $V_V$ most-recently acquired by the measuring instrument 84 and above Equation 1.

In step S33, the controller 132 determines whether or not the difference δ between the distance d and the distance $d_c$ is greater than a predetermined threshold value $δ_{th}$. Specifically, the controller 132 calculates the difference δ between the most-recently measured distance d between the emission opening 28 and the process portion S and the distance $d_c$ acquired in the most-recent step S32 (i.e., δ=d−$d_c$).

When the controller 132 determines that an absolute value of the difference δ (i.e., |d−$d_c$|) is greater than the threshold value $δ_{th}$ (i.e., determines YES), it proceeds to step S34. On the other hand, when the controller 132 determines that the absolute value of the difference δ is equal to or smaller than the threshold value $δ_{th}$ (i.e., determines NO), it proceeds to step S15. The threshold value $δ_{th}$ is predetermined by the operator.

In step S34, the controller 132 changes the target position of the nozzle 24. Specifically, if the difference δ calculated in most-recent step S33 is a positive value, the controller 132 changes the target position of the nozzle 24 set at the start of this step S34 to a new target position moved from the original target position in the z-axis negative direction.

Then, the controller 132 functions as the movement controller 108 to operate the positioning device 18 so as to move the nozzle 24 in the z-axis negative direction in order to dispose the nozzle 24 at the new target position. As a result, the nozzle 24 approaches the workpiece W, and whereby the distance d between the emission opening 28 and the process portion S decreases.

On the other hand, if the difference δ calculated in most-recent step S33 is a negative value, the controller 132 changes the target position of the nozzle 24 set at the start of this step S34 to a new target position moved from the original target position in the z-axis positive direction. Then, the controller 132 operates the positioning device 18 so as to move the nozzle 24 in the z-axis positive direction in order to dispose the nozzle 24 at the new target position. As a result, the nozzle 24 moves away from the workpiece W, and whereby the distance d between the emission opening 28 and the process portion S increases. After performing step S34, the controller 132 returns to step S32.

On the other hand, when determining NO in step S33, the controller 132 performs above-described step S15, in which, when determining YES, the controller 132 sends the command to the laser oscillator 12 so as to stop the laser oscillation operation to end the flow illustrated in FIG. 21, while it returns to step S32 when determining NO.

Thus, in the laser processing system 130, the controller 132 changes the target position of the nozzle 24 based on the position $x_1$ of the first maximum point 32 acquired by the jet observation apparatus 80 during the laser process, and performs feedback control for the positioning device 18 according to the changed target position to move the nozzle 24.

That is, the target position of the nozzle 24 is determined as a predetermined range (the range in which 0≤β≤$β_{th}$ is satisfied) based on the position $x_1$ of the first maximum point 32. By this feedback control, the process portion S can be continuously disposed in the first Mach disk region 33 during the process on the workpiece W. That is, the first Mach disk region 33 in the laser processing system 130 can be defined as a region of the range in which the above-mentioned difference δ satisfies 0≤δ≤$δ_{th}$.

According to the laser processing system 130, it is possible to carry out the laser process on the workpiece W in a state where the process portion S is disposed in the first Mach disk region 33, even when the distance d between the emission opening 28 and the process portion S changes due to some factor. Accordingly, the assist gas can be effectively utilized.

Figure 22:
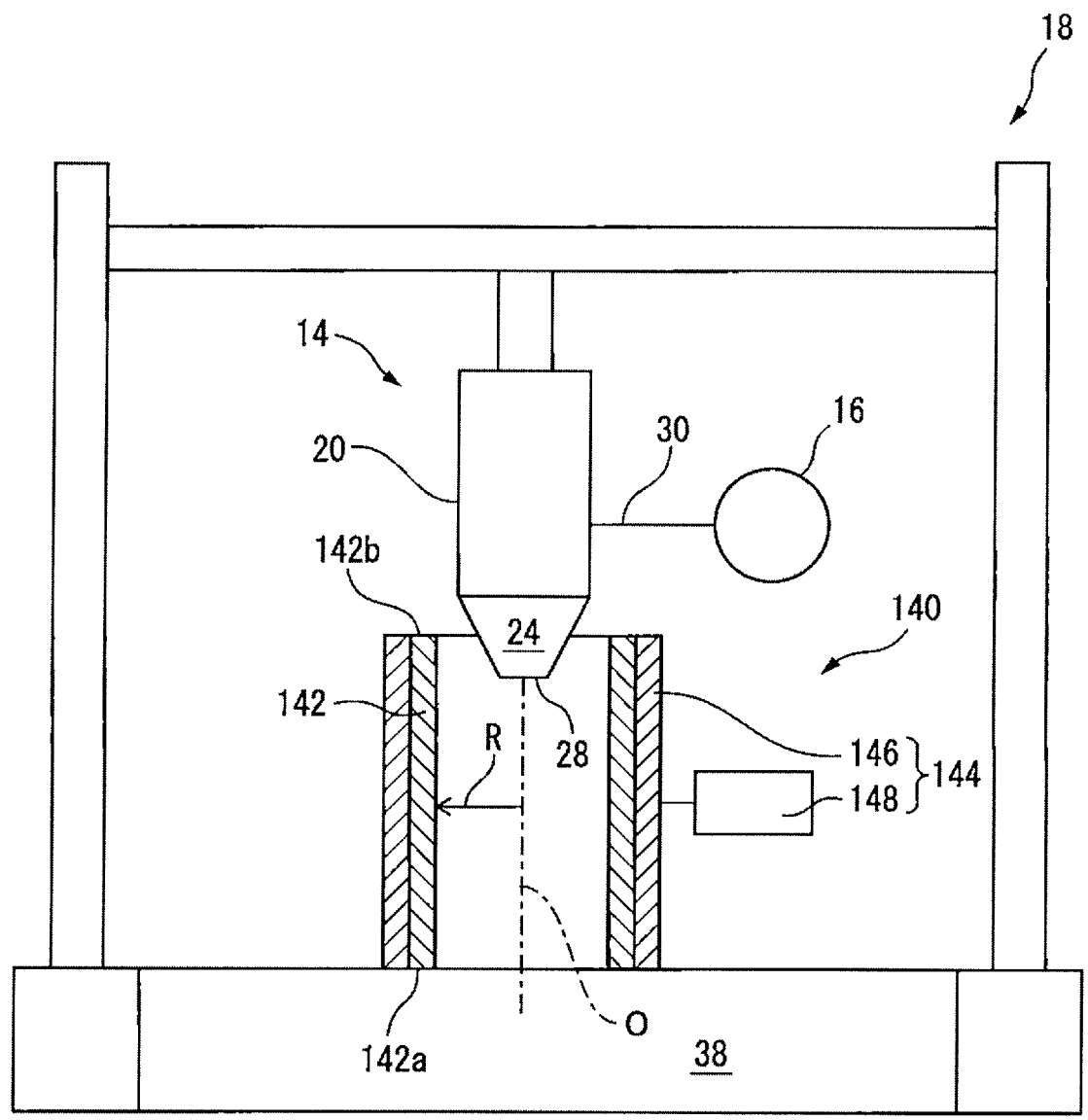
FIG. 22 is a diagram of a jet adjustment device.

Next, a jet adjustment device 140 will be described with reference to FIG. 22. The jet adjustment device 140 is configured to adjust the position $x_1$, $x_2$ of the maximum point 32, 34 of the jet emitted from the emission opening 28 of the nozzle 24, and includes an enclosure 142 and an enclosure driver 144. The enclosure 142 is a tubular member having a radial inner dimension.

The enclosure 142 is comprised of a flexible cylindrical member having a radius R as the radial inner dimension. The cylindrical member is made of e.g. a bristle material, a resin material, or a rubber material. The enclosure 142 is disposed substantially concentric with the emission opening 28 with respect to the optical axis O, and includes an end 142a in the z-axis negative direction and an end 142b opposite the end 142a.

The end 142a is placed on the installation surface of the work table 38. The end 142b is disposed at a position separate away from the emission opening 28 in the z-axis positive direction. In other words, the enclosure 142 has a length in the z-axis direction sufficient to dispose the end 142b to separate away from the emission opening 28 in the z-axis positive direction during the process on the workpiece.

The enclosure driver 144 includes a mechanism section 146 configured to deform the enclosure 142 so as to change the radius R of the enclosure 142, and a power section 148 configured to generate power for driving the mechanism section 146. There are various embodiments as the enclosure 142 and the mechanism section 146 that can change the radius R. Below, examples of the enclosure 142 and the mechanism section 146 will be described with reference to FIG. 23 and FIG. 24. Note that, in FIG. 23 and FIG. 24, the enclosure 142 is illustrated by a dotted line, for the sake of easy understanding.

Figure 23:
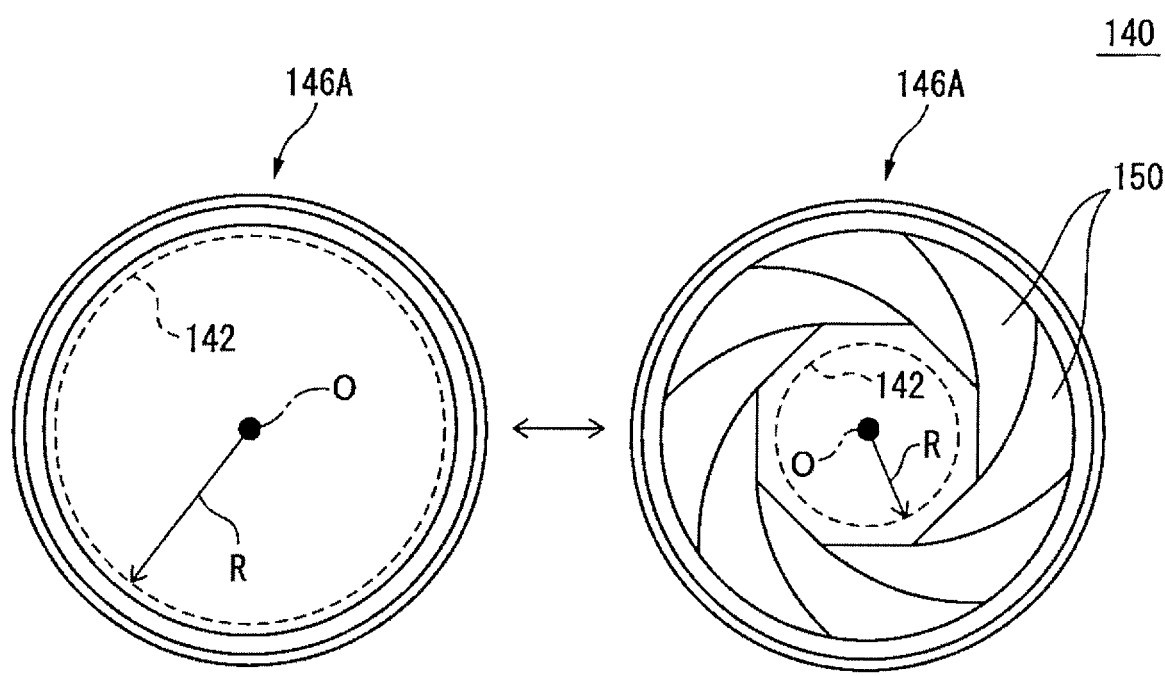
FIG. 23 illustrates an example of a mechanism section illustrated in FIG. 22.

A mechanism section 146A illustrated in FIG. 23 is a so-called iris diaphragm mechanism used in e.g. a camera. Specifically, the mechanism section 146A includes a plurality of blades 150 which are driven to move radially inward while rotating in a circumferential direction. The enclosure 142 is coupled to an inner edge of the plurality of blades 150, and is deformed to decrease or increase its radius R along with the operation of the blades 150. The power section 148 include e.g. a servo motor, and drives the mechanism section 146A so as to decrease and increase the radius R of the enclosure 142.

Figure 24:
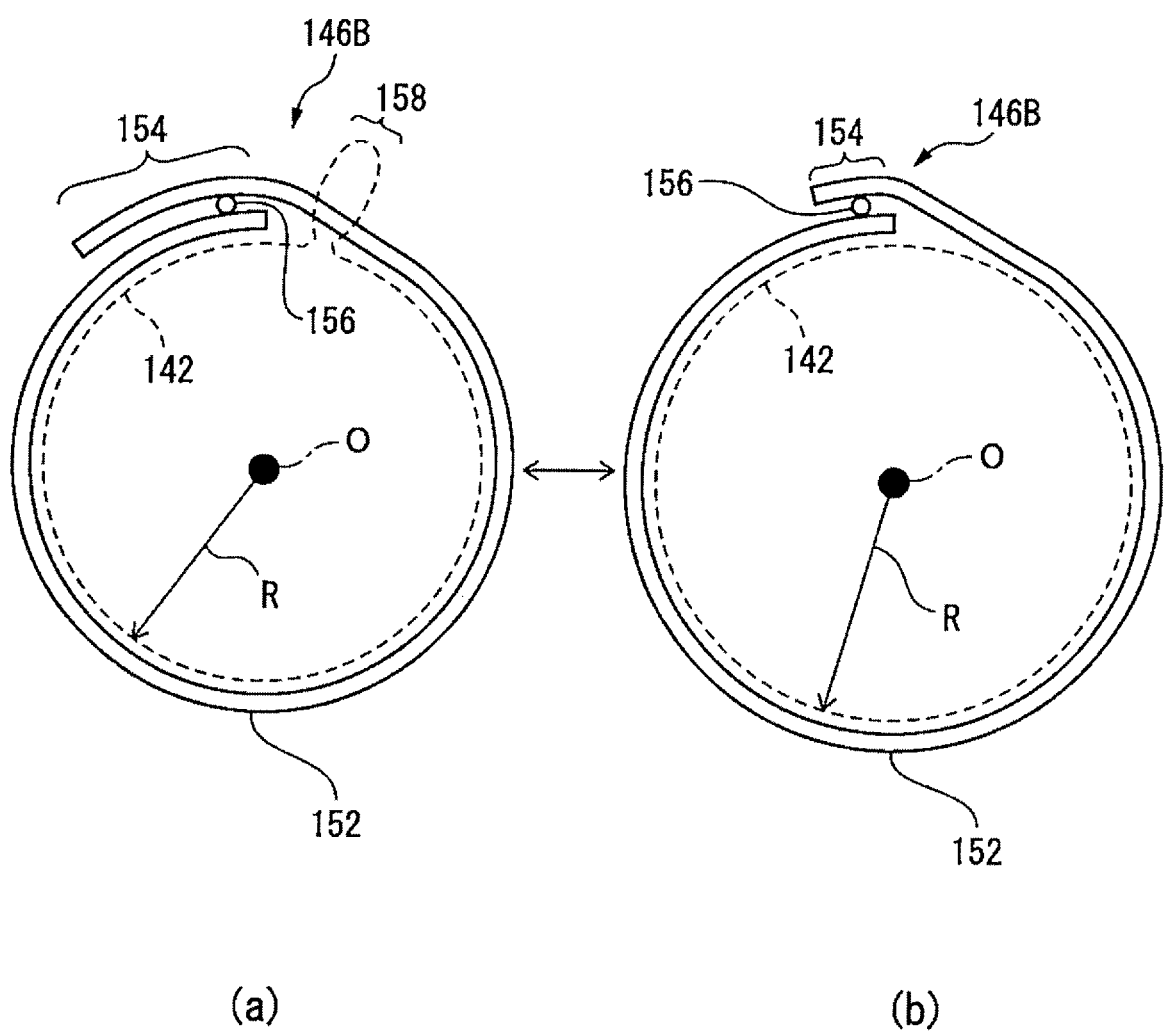
FIG. 24 illustrates another example of the mechanism section illustrated in FIG. 22.

On the other hand, a mechanism section 146B illustrated in FIG. 24 includes an arm 152 extending in a circumferential direction around the optical axis O, and a gear 156 provided in an overlapping region 154 of the arm 152. Teeth are formed on respective circumferential surfaces of the arm 152 opposing to each other in the overlap region 154, wherein the gear 156 engages the teeth. The enclosure 142 is coupled to an inner circumference of the arm 152 other than the overlap region 154.

In a state illustrated in Section (a) in FIG. 24, the length in the circumferential direction of the overlapping region 154 of the arm 152 is large, and a slack 158 is formed in the enclosure 142. As the gear 156 is rotated in one direction from the state illustrated in Section (a) in FIG. 24, the overlapping region 154 of the arm 152 is reduced, along with which, the slack 158 of the enclosure 142 is gradually diminished in the circumferential direction, whereby the radius R of the enclosure 142 is increased as in a state illustrated in Section (b) in FIG. 24.

Conversely, as the gear 156 is rotated in the other direction from the state illustrated in Section (b) in FIG. 24, the overlapping region 154 of the arm 152 is enlarged, along with which, the slack 158 of the enclosure 142 is gradually formed greater, and whereby the radius R of the enclosure 142 is decreased as in the state illustrated in Section (a) in FIG. 24. The power section 148 includes e.g. a servo motor, and rotates the gear 156 so as to decrease and increase the radius R of the enclosure 142.

Referring again to FIG. 22, the jet adjustment device 140 can adjust the position $x_1$ of the first maximum point 32 and the position $x_2$ of the second maximum point 34, by changing the radius R of the enclosure 142. A principle for making it possible to adjust the position $x_1$, $x_2$ of the maximum point 32, 34 in this manner will be described below.

As described above, the assist gas emitted from the emission opening 28 is reflected at a boundary with outer atmosphere, and whereby the Mach disk is formed in the jet. When the enclosure 142 is installed, an atmospheric layer present between the jet and the enclosure 142 is pressed by the jet, whereby increasing particle density in the atmospheric layer.

If the assist gas is reflected at the boundary with the atmospheric layer pressed in this manner, the reflection angle and the reflection position of the assist gas is changed, as a result of which, the position of the Mach disk (i.e., the position $x_1$, $x_2$ of the maximum point 32, 34) formed in the jet is changed when compared to a case without the enclosure 142.

When the inner dimension of the enclosure 142 is changed, the volume and the particle density of the atmospheric layer present between the jet and the enclosure 142 is changed, and whereby the position of the Mach disk formed in the jet can be changed. By making use of such a principle, the jet adjustment device 140 adjusts the position $x_1$, $x_2$ of the maximum point 32, 34 in the direction of the optical axis O.

Specifically, the jet adjustment device 140 displaces the position $x_1$, $x_2$ of the maximum point 32, 34 to downstream side of the jet (i.e., a direction away from the emission opening 28 along the optical axis O), by decreasing the radius R of the enclosure 142. On the other hand, the jet adjustment device 140 displaces the position $x_1$, $x_2$ of the maximum point 32, 34 to upstream side of the jet, by increasing the radius R of the enclosure 142.

According to the jet adjustment device 140, by changing the inner dimension (radius R) of the enclosure 142, it is possible to adjust the position $x_1$, $x_2$ of the maximum point 32, 34 so as to dispose the process portion S in the first Mach disk region 33, in response to variation in the distance d between the emission opening 28 and the process portion S during the process on the workpiece.

Further, when the radius R of the enclosure 142 is decreased in a state where the supply pressure $P_s$ to the chamber 29 formed inside the nozzle 24 having the predetermined opening dimension $\phi$ is constant, the position $x_1$, $x_2$ of the maximum point 32, 34 is displaced to downstream side of the jet, along with the velocity V of the jet at the position $x_1$, $x_2$ increasing. Thus, the velocity V of the jet in the Mach disk region 33, 35 where the workpiece W is to be disposed can be increased without changing the supply pressure $P_s$.

In other words, even when the supply pressure $P_s$ is reduced, the velocity V of the jet in the Mach disk region 33, 35 can be maintained by decreasing the diameter of the enclosure 142. According to this configuration, since a consumption amount of the assist gas can be reduced, it is possible to reduce the cost. Note that, the enclosure driver 144 may be omitted, and the inner dimension of the enclosure 142 may be changed manually.

Figure 25:
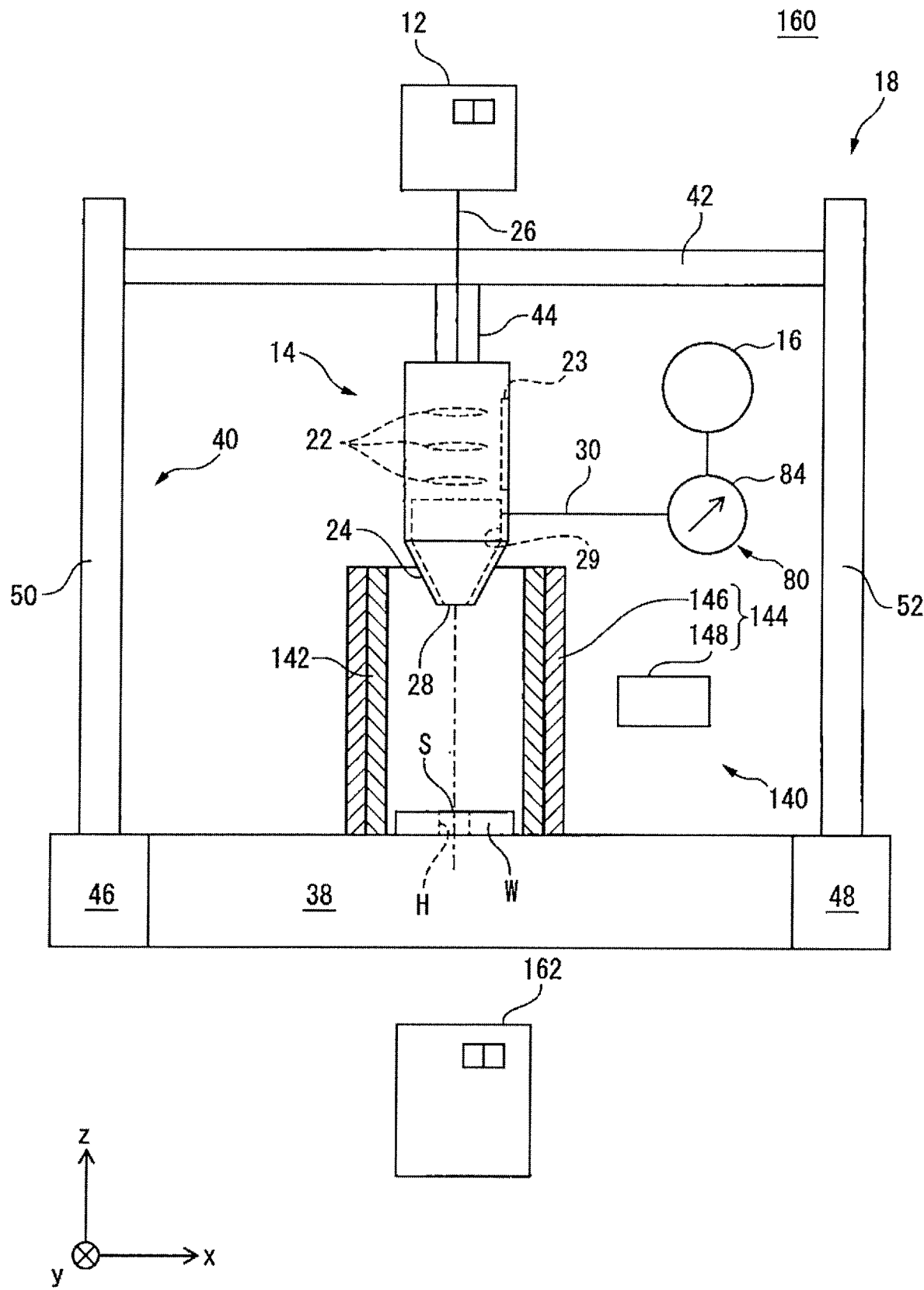
FIG. 25 is a diagram of yet another laser processing system.
Figure 26:
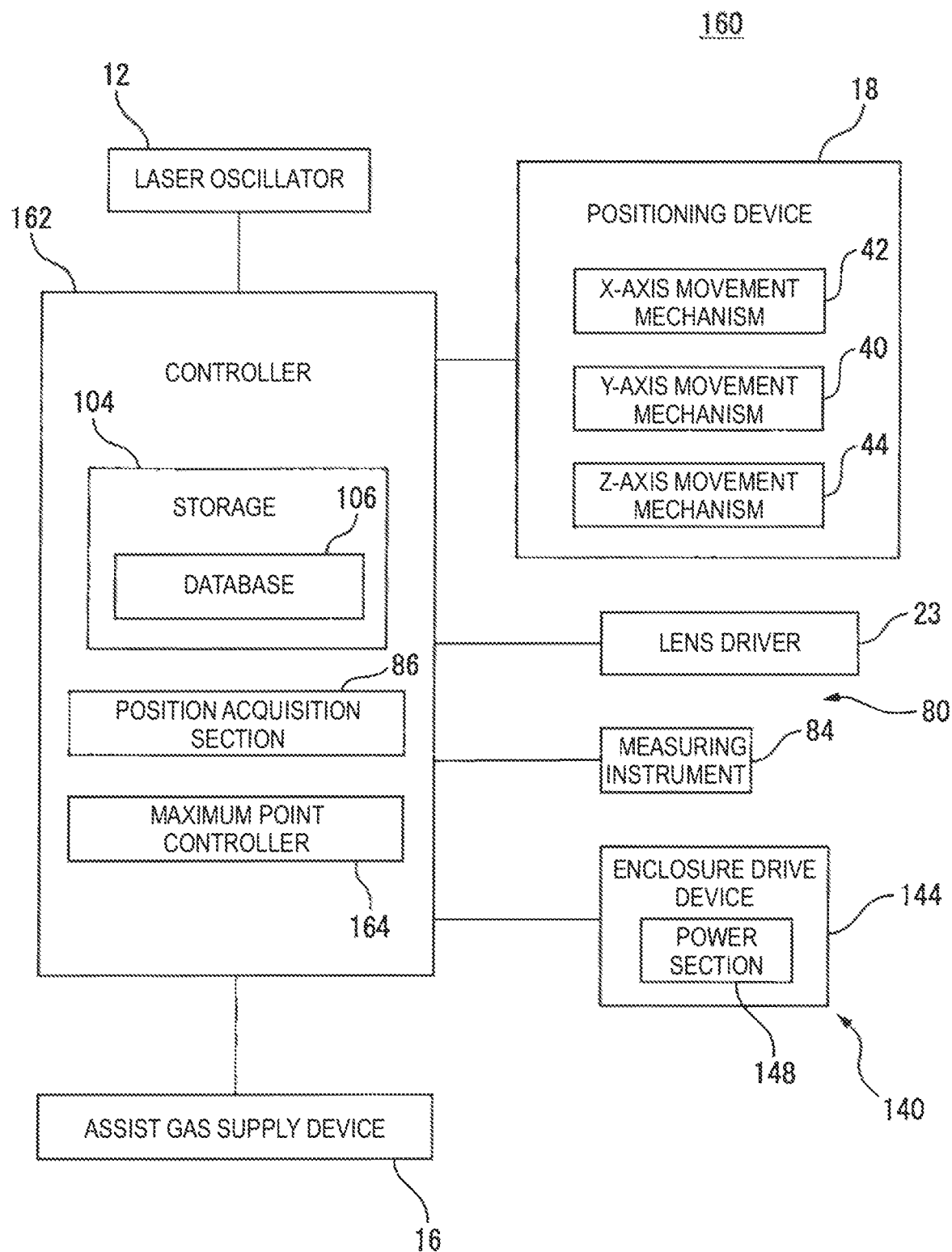
FIG. 26 is a block diagram of the laser processing system illustrated in FIG. 25.

Next, a laser processing system 160 will be described with reference to FIG. 25 and FIG. 26. The laser processing system 160 includes the laser oscillator 12, the laser processing head 14, the assist gas supply device 16, the positioning device 18, the measuring instrument 84, the jet adjustment device 140, and a controller 162.

The controller 162 includes a processor and the storage 104, and controls the laser oscillator 12, the laser processing head 14, the assist gas supply device 16, the positioning device 18, the measuring instrument 84, and the jet adjustment device 140 (specifically, the power section 148). The database 106 as shown in above Table 1 is stored in the storage 104. The controller 162 functions as the above-described position acquisition section 86. Thus, the measuring instrument 84 and the controller 162 constitute the jet observation apparatus 80 described above.

Figure 27:
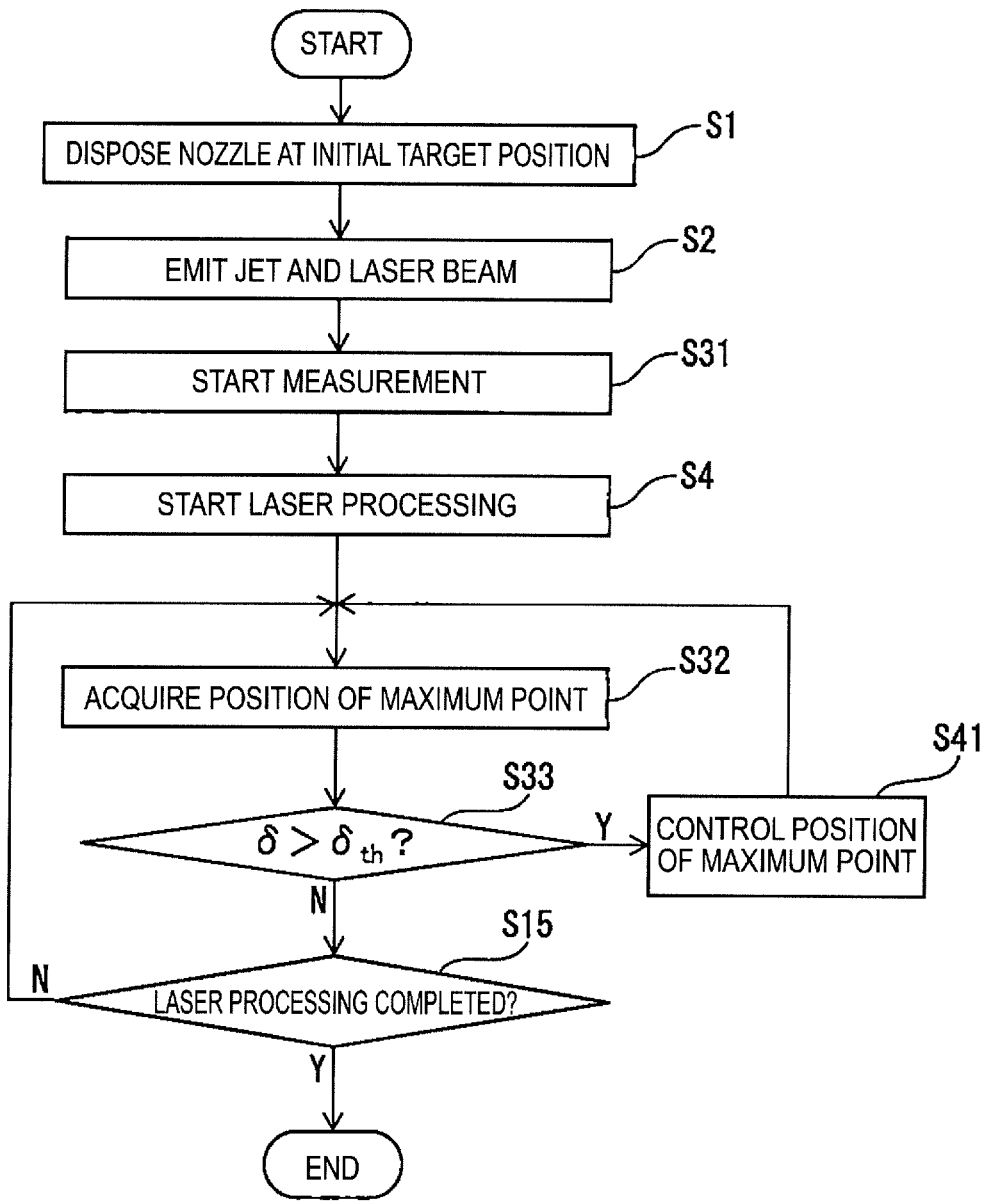
FIG. 27 is a flowchart illustrating an example of an operation flow of the laser processing system illustrated in FIG. 25.

Next, operation of the laser processing system 160 will be described with reference to FIG. 27. A flow illustrated in FIG. 27 is started when the controller 162 receives a processing start command from an operator, a host controller, or a processing program. Note that, in the flow illustrated in FIG. 27, processes similar to those of the flow illustrated in FIG. 21 are assigned the same step numbers, and redundant descriptions thereof will be omitted.

After starting the flow illustrated in FIG. 27, the controller 162 carries out steps S1 to S33 similar to the flow illustrated in FIG. 21. When determining YES in step S33, in step S41, the controller 162 controls the position $x_1$ of the first maximum point 32. Specifically, when the difference $\delta(=d-d_c)$ calculated in most-recent step S33 is a positive value, the controller 162 sends a command to the power section 148 of the enclosure driver 144 so as to decrease the inner dimension (radius R) of the enclosure 142. Due to this, the position $x_1$ of the first maximum point 32 is displaced to downstream side of the jet.

On the other hand, when the difference $\delta$ calculated in most-recent step S33 is a negative value, the controller 162 operates the enclosure driver 144 so as to increase the inner dimension (radius R) of the enclosure 142. Due to this, the position $x_1$ of the first maximum point 32 is displaced to upstream side of the jet.

In this way, the controller 162 functions as a maximum point controller 164 configured to control the position $x_1$ of the first maximum point 32 by changing the inner dimension of the enclosure 142 based on information of the position $x_1$ of the first maximum point 32 acquired by the position acquisition section 86 in step S32. After executing step S41, the controller 162 returns to step S32.

According to the laser processing system 160, it is possible to continuously dispose the process portion S in the first Mach disk region 33 during the process on the workpiece W, by changing the inner dimension of the enclosure 142, without moving the nozzle 24. According to this configuration, even when the distance d between the emission opening 28 and the process portion S changes due to some factor, it is possible to carry out the laser process on the workpiece W along with disposing the process portion S in the first Mach disk region 33. Thus, the assist gas can be effectively utilized.

Note that, in the laser processing system 160, the storage 104 may store a database in which a plurality of the target distances $d_T$ are recorded in association with the opening dimensions $\delta$ of the nozzle 24, the supply pressures $P_S$, and the inner dimensions (radii R) of the enclosure 142. In this case, in above-described step S41, the controller 162 can determine a target inner dimension of the enclosure 142 by applying the opening dimension $\phi$, the supply pressure $P_S$, and the distance $d_c$ calculated in step S32 as the target position distance $d_T$ to the database.

Then, in step S41, the controller 162 operates the enclosure driver 144 so as to change the inner dimension of the enclosure 142 to the target inner dimension acquired from the database. As a result, it is possible to accurately dispose the process portion S in the first Mach disk region 33.

Further, the above-described laser processing system 130 can also perform the flow illustrated in FIG. 27. In this case, in step S41, the controller 132 may control the position $x_1$, $x_2$ of the maximum point 32, 34 by changing the supply pressure $P_s$ to the chamber 29. In this respect, if the supply pressure $P_s$ to the chamber 29 is increased, the position $x_1$, $x_2$ of the maximum point 32, 34 is displaced to downstream side of the jet (i.e., the direction away from the emission opening 28 along the optical axis O).

On the other hand, if the supply pressure $P_s$ to the chamber 29 is decreased, the position $x_1$, $x_2$ of the maximum point 32, 34 is displaced to upstream side of the jet (i.e., the direction approaching the emission opening 28 along the optical axis O). In step S41, when the difference $\delta(=d-d_c)$ calculated in most-recent step S33 is a positive value, the controller 132 sends a command to the assist gas supply device 16 so as to increase the supply pressure $P_s$. Due to this, the position $x_1$ of the first maximum point 32 is displaced to downstream side of the jet.

On the other hand, when the difference $\delta$ calculated in most-recent step S33 is a negative value, the controller 132 sends a command to the assist gas supply device 16 so as to decrease the supply pressure $P_s$. Due to this, the position $x_1$ of the first maximum point 32 is displaced to upstream side of the jet. In this way, the controller 132 functions as a maximum point controller configured to control the position $x_1$ of the first maximum point 32 by changing the supply pressure $P_s$ based on the information of the position $x_1$ of the first maximum point 32 acquired by the position acquisition section 86 in step S32.

Note that, the positioning device 18 is not limited to the above-described structure, but may include e.g. a work table movable along the x-y plane, and a z-axis movement mechanism configured to move the nozzle 24 along the z-axis. Alternatively, the positioning device may be configured to simply fix the nozzle 24 at a position with respect to the workpiece W, manually, without any movement mechanism.

Figure 28:
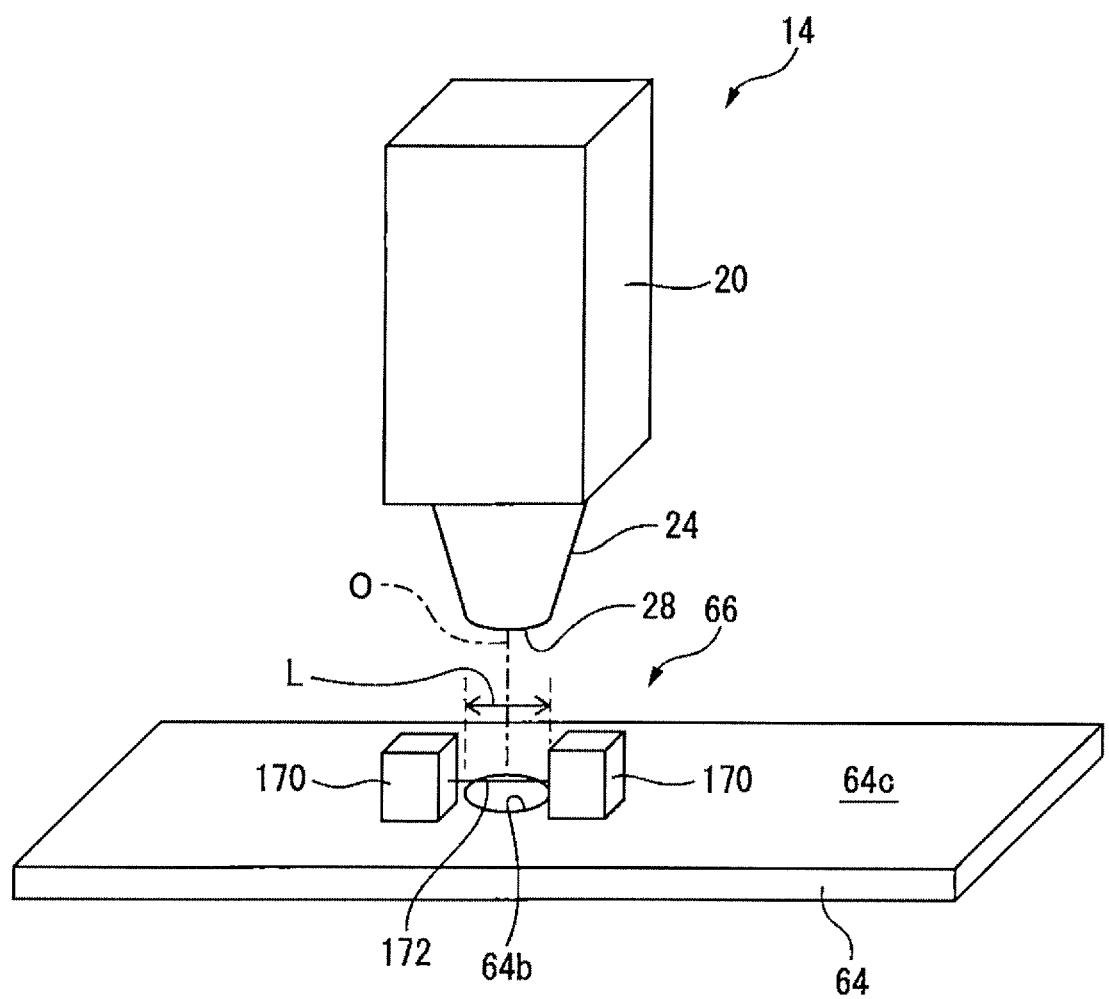
FIG. 28 illustrates an example of a measuring instrument.

Further, there are various embodiments of the dummy workpiece 64 and the measuring instrument 66 of the jet observation apparatus 60 illustrated in FIG. 4. Below, examples of the dummy workpiece 64 and the measuring instrument 66 will be described with reference to FIG. 28 and FIG. 29. In an example illustrated in FIG. 28, the dummy workpiece 64 has a circular through hole 64b formed at a position corresponding to the above-described dummy process portion 64b. The opening dimension of the through hole 64b is set to be substantially the same as the opening dimension of the through hole that is estimated to be formed when the workpiece W is perforated by the laser beam emitted from the nozzle 24.

The measuring instrument 66 includes a pair of columns 170 and a hot-wire 172. The pair of columns 170 extends from a surface 64c of the dummy workpiece 64 in the z-axis positive direction, so as to be opposite to each other. The hot-wire 172 is linearly strained between the pair of columns 170, and the resistance value thereof varies in response to the velocity V of the jet emitted from the emission opening 28.

For example, the length L of the hot-wire 172 extending between the pair of columns 170 (i.e., the distance between the pair of columns 170) may be set to be equal to or smaller than the opening dimension $\phi$ of the emission opening 28, or equal to or smaller than the opening dimension of the through hole 64b. Alternatively, the hot-wire 172 may be comprised of a material having high stiffness. By setting the length L to be small or making the hot-wire 172 from the material with high stiffness in this manner, it is possible to prevent the hot-wire 172 from bending when the hot-wire 172 is disposed in the jet.

Further, the distance from the surface 64c of the dummy workpiece 64 to the hot-wire 172 may be set to e.g. 0.5 mm or less. By setting the distance from the surface 64c to the hot-wire 172 to be smaller in this way, the velocity V of the jet can be measured at a position closer to the process portion S of the workpiece W during the laser process.

Figure 29:
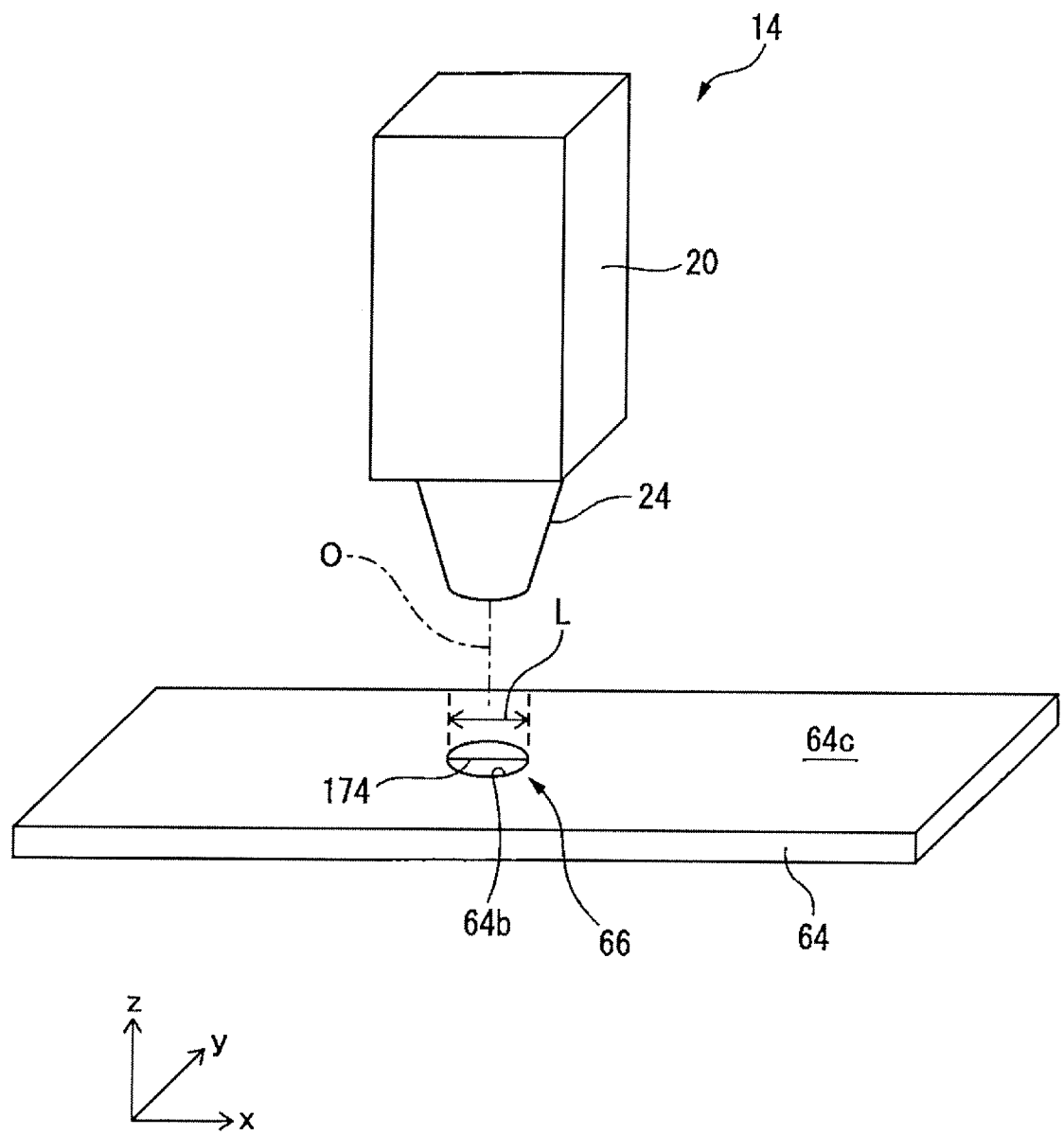
FIG. 29 illustrates another example of the measuring instrument.

In an example illustrated in FIG. 29, the measuring instrument 66 includes a hot-wire 174 strained in the through hole 64b. The length L of the hot-wire 174 coincides with the opening dimension of the through hole 64b. The hot-wire 174 is disposed at the position of the surface 64c of the dummy workpiece 64. According to such an arrangement of the hot-wire 174, the velocity V of the jet can be measured at a position closer to the process portion S of the workpiece W during the laser process. As described above, the measuring instrument 66 in FIG. 28 and FIG. 29 constitutes a hot-wire anemometer.

Note that, in the embodiments described above, when the workpiece W is processed, the workpiece W may be disposed in the second Mach disk region 35 (second maximum point 34) or in an n-th Mach disk region (n is an integer of 3 or greater). Further, instead of the above-described jet observation apparatuses 60, 70 or 80, a high-speed camera may be employed to capture an image as shown in FIG. 2, and the position $x_1$, $x_2$ of the maximum point 32, 34 may be measured based on the image, for example.

In addition, the shape of the emission opening 28 is not limited to a circular shape, but may have any shape such as a polygonal shape or an elliptical shape. Further, the features of the various embodiments described above may be combined with each other. For example, the jet observation apparatus 80 may be combined with the laser processing system 110 or 120, or the jet adjustment device 140 may be combined with the laser processing system 110 or 120.

While the present disclosure has been described through specific embodiments, the above-described embodiments do not limit the invention as defined by the appended claims.

The invention claimed is:

1. A laser processing system comprising:
a nozzle including an emission opening configured to emit a jet of an assist gas along an optical axis of a laser beam, the nozzle being configured to form a maximum point of velocity of the jet at a position away from the emission opening;
a sound sensor configured to measure a sound generated by the jet impinging on an object; and
a processor configured to acquire information representing the position of the maximum point based on output data of the sound sensor.

2. The laser processing system of claim 1, wherein the sound sensor consecutively measures the sound while the nozzle is moved close to or away from the object,
wherein the processor acquires, as the information, a peak value of the consecutive output data output by the sound sensor.

3. The laser processing system of claim 1, wherein the sound sensor includes:
a microphone configured to convert the sound into an electrical signal,
wherein the sound sensor is configured to acquire a frequency characteristic of the sound from the electrical signal.

4. The laser processing system of claim 1, further comprising:
a movement mechanism configured to move the nozzle and the object relative to each other; and
a movement controller configured to control the movement mechanism so as to dispose the nozzle with respect to the object at a target position determined based on the information.

5. The laser processing system of claim 4, wherein the target position is determined based on the information representing a predetermined position range including the position of the maximum point.

6. The laser processing system of claim 4, wherein the movement controller performs feedback control for the movement mechanism in accordance with the target position.

7. A method of laser process on object using the laser processing system of claim 1, the method comprising:
emitting the jet from the emission opening of the nozzle and processing the object with the laser beam, while disposing the nozzle with respect to a process portion of an object at a target position determined based on the information.

8. A jet observation apparatus comprising:
a sound sensor configured to consecutively measure a sound generated by a jet of a gas, which is emitted from an emission opening of a nozzle, impinging on an object while the nozzle is moved close to or away from the object; and
a processor configured to acquire, as information representing a position of a maximum point of velocity of the jet, a peak value of consecutive output data output by the sound sensor, the maximum point being formed at the position away from the emission opening.

9. A method of observing a jet, the method comprising:
consecutively measuring a sound generated by a jet of a gas, which is emitted from an emission opening of a nozzle, impinging on an object while the nozzle is moved close to or away from the object; and
acquiring, as information representing a position of a maximum point of velocity of the jet, a peak value of data obtained by consecutive measurement, the maximum point being formed at the position away from the emission opening.

* * * * *